(12) United States Patent
Kono

(10) Patent No.: US 7,908,408 B2
(45) Date of Patent: Mar. 15, 2011

(54) STORAGE DEVICE AND CONTROL METHOD THEREOF

(75) Inventor: Taiki Kono, Odawara (JP)

(73) Assignee: Hitachi, Ltd., Tokyo (JP)

( * ) Notice: Subject to any disclaimer, the term of this patent is extended or adjusted under 35 U.S.C. 154(b) by 309 days.

(21) Appl. No.: 12/236,547

(22) Filed: Sep. 24, 2008

(65) Prior Publication Data

US 2010/0023652 A1  Jan. 28, 2010

(30) Foreign Application Priority Data

Jul. 22, 2008  (JP) ................. 2008-188994

(51) Int. Cl.
*G06F 3/00* (2006.01)
(52) U.S. Cl. ................... 710/16; 710/8; 710/14; 710/18
(58) Field of Classification Search ................. 710/18, 710/8, 14, 16
See application file for complete search history.

(56) References Cited

U.S. PATENT DOCUMENTS

| | | | | |
|---|---|---|---|---|
| 2003/0204597 | A1* | 10/2003 | Arakawa et al. | 709/226 |
| 2004/0153863 | A1* | 8/2004 | Klotz et al. | 714/45 |
| 2005/0193167 | A1* | 9/2005 | Eguchi et al. | 711/114 |

FOREIGN PATENT DOCUMENTS

JP    2006-331458    12/2006

OTHER PUBLICATIONS

Intel IOmeter screenshot1, Dec. 23 2006, http://web.archive.org/web/20061221143054/www.iometer.org/graphics/screen1.jpg9/22/2010.*
Intel IOmeter project, Dec. 23, 2006, http://web.archive.org/web/20061223093406/www.iometer.org/9/22/2010.*
Intel IOmeter screenshot2, Decmber 23, 2006, http://web.archive.org/web/20061221143701/www.iometer.org/graphics/screen2.jpg9/22/2010.*

\* cited by examiner

*Primary Examiner* — Chun-Kuan Lee
*Assistant Examiner* — Farley Abad
(74) *Attorney, Agent, or Firm* — Hitachi America, Ltd.

(57) ABSTRACT

The present invention provides a storage device and a control method thereof which can enhance general-use property and availability of a storage system while enhancing I/O performance of the storage system as a whole. The storage device is provided with an external connection function in which a command is generated in response to a read request or a write request given by a host computer, and the generated command is issued to an external storage device via any of a plurality of ports. In such a storage device, a channel processor, for every kind of the command, issues a test command to the external storage device in a plurality of issuing methods, measures an I/O performance for every issuing method, displays a result of measurement of the I/O performance for every method, and/or sets the issuing method in issuing the command to the external storage device based on the result of measurement of the I/O performance for every issuing method.

16 Claims, 25 Drawing Sheets

FIG. 2

| EXTERNAL STORAGE KIND | COMMAND ISSUING PATTERN NUMBER | COMMAND ISSUING METHOD | COMMAND SIZE | MEASUREMENT RESULT | | | | | | | |
|---|---|---|---|---|---|---|---|---|---|---|---|
| | | | | SEQ READ (MB) | | SEQ WRITE (MB) | | RAND READ (TIME) | | RAND WRITE (TIME) | |
| Hitachi USP(11111) | 1 | A | — | ○ | MEASUREMENT RESULT | ○ | MEASUREMENT RESULT | ○ | MEASUREMENT RESULT | ○ | MEASUREMENT RESULT |
| Hitachi USP(11111) | 2 | B | 0 | ○ | MEASUREMENT RESULT | ○ | MEASUREMENT RESULT | ○ | MEASUREMENT RESULT | ○ | MEASUREMENT RESULT |
| Hitachi USP(11111) | 3 | B | 10,000,000 | ○ | MEASUREMENT RESULT | ○ | MEASUREMENT RESULT | ○ | MEASUREMENT RESULT | ○ | MEASUREMENT RESULT |
| Hitachi USP(11111) | 4 | B | 20,000,000 | ○ | MEASUREMENT RESULT | ○ | MEASUREMENT RESULT | ○ | MEASUREMENT RESULT | ○ | MEASUREMENT RESULT |
| Hitachi USP(11111) | 5 | B | 50,000,000 | ○ | MEASUREMENT RESULT | ○ | MEASUREMENT RESULT | ○ | MEASUREMENT RESULT | ○ | MEASUREMENT RESULT |
| Hitachi USP(11111) | 6 | C | 0 | ○ | MEASUREMENT RESULT | ○ | MEASUREMENT RESULT | × | | × | |
| Hitachi USP(11111) | 7 | C | 10,000,000 | ○ | MEASUREMENT RESULT | ○ | MEASUREMENT RESULT | × | | × | |
| Hitachi USP(11111) | 8 | C | 20,000,000 | ○ | MEASUREMENT RESULT | ○ | MEASUREMENT RESULT | × | | × | |
| Hitachi USP(11111) | 9 | C | 50,000,000 | ○ | MEASUREMENT RESULT | ○ | MEASUREMENT RESULT | × | | × | |
| Hitachi USP(11111) | 10 | D | 0 | ○ | MEASUREMENT RESULT | ○ | MEASUREMENT RESULT | × | | × | |
| Hitachi USP(11111) | 11 | D | 10,000,000 | ○ | MEASUREMENT RESULT | ○ | MEASUREMENT RESULT | × | | × | |
| Hitachi USP(11111) | 12 | D | 20,000,000 | ○ | MEASUREMENT RESULT | ○ | MEASUREMENT RESULT | × | | × | |
| Hitachi USP(11111) | 13 | D | 50,000,000 | ○ | MEASUREMENT RESULT | ○ | MEASUREMENT RESULT | × | | × | |
| Hitachi AMS(D6002222) | 1 | A | — | ○ | MEASUREMENT RESULT | ○ | MEASUREMENT RESULT | ○ | MEASUREMENT RESULT | ○ | MEASUREMENT RESULT |
| Hitachi AMS(D6002222) | 2 | B | 0 | ○ | MEASUREMENT RESULT | ○ | MEASUREMENT RESULT | ○ | MEASUREMENT RESULT | ○ | MEASUREMENT RESULT |
| Hitachi AMS(D6002222) | 3 | B | 10,000,000 | ○ | MEASUREMENT RESULT | ○ | MEASUREMENT RESULT | ○ | MEASUREMENT RESULT | ○ | MEASUREMENT RESULT |
| Hitachi AMS(D6002222) | 4 | B | 20,000,000 | ○ | MEASUREMENT RESULT | ○ | MEASUREMENT RESULT | ○ | MEASUREMENT RESULT | ○ | MEASUREMENT RESULT |
| ⋯ | ⋯ | ⋯ | ⋯ | ⋯ | | ⋯ | | ⋯ | | ⋯ | |

FIG. 3

| EXTERNAL STORAGE KIND | COMMAND KIND | TEST TIME (MIN/PATTERN) | EXTERNAL STORAGE ISSUING LU NUMBER | COMMAND ISSUING SIZE | USE PORT |
|---|---|---|---|---|---|
| Hitachi USP(11111) | SEQUENTIAL READ | 5 | 10 | 100,000 | 1A/2A/1G/2G/·· |
| Hitachi USP(11111) | SEQUENTIAL WRITE | 5 | 10 | 100,000 | 1A/2A/1G/2G/·· |
| Hitachi USP(11111) | RANDOM READ | 5 | 10 | 100,000 | 1A/2A/1G/2G/·· |
| Hitachi USP(11111) | RANDOM WRITE | 5 | 10 | 100,000 | 1A/2A/1G/2G/·· |
| Hitachi AMS(D6002222) | SEQUENTIAL READ | 5 | 10 | 100,000 | 3A/4A/3G/4G/·· |
| Hitachi AMS(D6002222) | SEQUENTIAL WRITE | 5 | 10 | 100,000 | 3A/4A/3G/4G/·· |
| Hitachi AMS(D6002222) | RANDOM READ | 5 | 10 | 100,000 | 3A/4A/3G/4G/·· |
| Hitachi AMS(D6002222) | RANDOM WRITE | 5 | 10 | 100,000 | 3A/4A/3G/4G/·· |
| ·· | ·· | ·· | ·· | ·· | ·· |
| 36A | 36B | 36C | 36D | 36E | 36F |

| EXTERNAL STORAGE KIND | COMMAND KIND | COMMAND ISSUING PATTERN NUMBER | OPERATION TIME |
|---|---|---|---|
| Hitachi USP(11111) | SEQUENTIAL READ | 11 | default |
| Hitachi USP(11111) | SEQUENTIAL WRITE | 11 | default |
| Hitachi USP(11111) | RANDOM READ | 2 | default |
| Hitachi USP(11111) | RANDOM WRITE | 2 | default |
| Hitachi USP(11111) | SEQUENTIAL READ | 13 | TIME SPAN OF "0:00 TO 6:00" |
| Hitachi USP(11111) | SEQUENTIAL WRITE | 13 | TIME SPAN OF "0:00 TO 6:00" |
| Hitachi USP(11111) | RANDOM READ | 5 | TIME SPAN OF "0:00 TO 6:00" |
| Hitachi USP(11111) | RANDOM WRITE | 13 | SUNDAY OF EVERY WEEK |
| Hitachi USP(11111) | SEQUENTIAL READ | 13 | SUNDAY OF EVERY WEEK |
| Hitachi USP(11111) | SEQUENTIAL WRITE | 5 | SUNDAY OF EVERY WEEK |
| Hitachi USP(11111) | RANDOM READ | 5 | SUNDAY OF EVERY WEEK |
| Hitachi AMS(D60022222) | SEQUENTIAL READ | 4 | default |
| Hitachi AMS(D60022222) | SEQUENTIAL WRITE | 4 | default |
| Hitachi AMS(D60022222) | RANDOM READ | 1 | default |
| Hitachi AMS(D60022222) | RANDOM WRITE | 1 | default |
| ... | ... | ... | ... |

| EXTERNAL STORAGE KIND | LUN | COMMAND KIND | TRANSMISSION PORT ID | START LBA | TOTAL SIZE | START TIME |
|---|---|---|---|---|---|---|
| Hitachi USP(11111) | 0 | Seq read | 2A | LBA | SIZE | 3250 |
| Hitachi USP(11111) | 1 | Rand read | 2A | LBA | SIZE | 1200 |
| Hitachi USP(11111) | 2 | Rand write | 1A | LBA | SIZE | 7440 |
| .. | .. | .. | .. | .. | .. | .. |
| 38A | 38B | 38C | 38D | 38E | 38F | 38G |

| EXTERNAL STORAGE KIND | LUN | PRIORITY ID |
|---|---|---|
| Hitachi USP(11111) | 0 | 1A |
| Hitachi USP(11111) | 1 | 2A |
| Hitachi USP(11111) | 2 | 1G |
| ⋮ | ⋮ | ⋮ |

EXTERNAL STORAGE
HITACHI USP(11111)

| No | COMMAND ISSUING METHOD | COMMAND SIZE | seq read | | seq write | | rand read | | rand write | |
|----|------------------------|--------------|----------|------|-----------|------|-----------|------|------------|------|
| 1  | A    | –          | ○ | 1183.1 | ○ | 467.5 | ○ | 107.6 | ○ | 66.4 |
| 2  | B    | 0          | ○ | 1216.8 | ○ | 464.5 | ○ | 150.0 | ○ | 75.0 |
| 3  | B    | 10,000,000 | ○ | 1150.3 | ○ | 311.3 | ○ | 104.7 | ○ | 72.7 |
| 4  | B    | 20,000,000 | ○ | 783.7  | ○ | 305.9 | ○ | 147.8 | ○ | 66.1 |
| 5  | B    | 50,000,000 | ○ | 1298.2 | ○ | 360.0 | ○ | 66.2  | ○ | 63.3 |
| 6  | C    | 0          | ○ | 1131.5 | ○ | 315.3 | × |       | × |      |
| 7  | C    | 10,000,000 | ○ | 847.1  | ○ | 497.7 | × |       | × |      |
| 8  | C    | 20,000,000 | ○ | 1134.1 | ○ | 258.3 | × |       | × |      |
| 9  | C    | 50,000,000 | ○ | 810.2  | ○ | 461.3 | × |       | × |      |
| 10 | D    | 0          | ○ | 627.6  | ○ | 500.0 | × |       | × |      |
| 11 | D    | 10,000,000 | ○ | 1500.0 | ○ | 449.5 | × |       | × |      |
| 12 | D    | 20,000,000 | ○ | 913.1  | ○ | 328.7 | × |       | × |      |
| 13 | D    | 50,000,000 | ○ | 1046.3 | ○ |       | × |       | × |      |
| 14 | FREE |            | × |        | × |       | × |       | × |      |
| 15 | FREE |            | × |        | × |       | × |       | × |      |
| 16 | FREE |            | × |        | × |       | × |       | × |      |
| 17 | FREE |            | × |        | × |       | × |       | × |      |

NEW ADDITION  EDITION  PERFORMANCE GRAPH

MEASUREMENT START  MEASUREMENT ENVIRONMENT SETTING  END

STORAGE DEVICE AND CONTROL METHOD THEREOF

CROSS REFERENCES TO RELATED APPLICATIONS

This application relates to and claims priority from Japanese Patent Application No. P2008-188994, field on Jul. 22, 2008, the entire disclosure of which is incorporated herein by reference.

BACKGROUND OF THE INVENTION

1. Field of the Invention

The present invention relates to a storage device and a control method thereof, and more particularly to a storage device which is preferably used as a storage device provided with an external connection function.

2. Description of the Related Art

Conventionally, as one of functions of the storage device, there has been known an external connection function which virtualizes a logical volume which other storage device connected to an own storage device (hereinafter referred to as an external storage device) provides (see JP-A-2006-331458).

In the storage device to which the external connection function is imparted (hereinafter referred to as "main storage device"), virtual logical volumes are set in the virtualized external storage device in a state that the virtual logical volumes are respectively made to correspond to logical volumes.

Further, the main storage device, when a read request or a write request is given to a certain virtual volume from a host computer, issues a command corresponding to the read request or the write request to the external storage device having the corresponding logical volume, and allows the external storage device to execute actual read processing or write processing.

According to such an external connection function, it is possible to realize the unity of management of the logical volumes which a plurality of external storage devices provides respectively and hence, the storage device has an advantageous effect that the addition of a storage device or the like can be easily realized.

Here, JP-A-2006-331458 discloses a technique in which when the main storage device transmits a command corresponding to a read request or a write request from a host computer to the corresponding external storage device, a processing state of read processing or write processing in the external storage device is monitored, and load distribution processing is executed when necessary.

SUMMARY OF THE INVENTION

Recently, with respect to a storage device which is used as an external storage device, there has been proposed a storage device to which various functions are imparted or a storage device which includes various characteristics. Among such storage devices, there exists a storage device which, in transmitting a command from a main storage device, deteriorates an I/O performance unless the command is issued with an issuing pattern corresponding to the function imparted to the storage device or the characteristic of the storage device.

For example, as a function which is imparted to the storage device, there has been known a sequential learning function which, when a read command of sequential data (continuous data) is continuously given, data which is estimated to be requested next time or after the next time is preliminarily read in a cache memory. However, among the storage devices to which such a sequential leaning function is imparted, there exists a storage device which, when commands are sequentially issued to an external storage device from a main storage device using a plurality of paths for enhancing the I/O performance, cannot recognize that data which constitutes an object to be read is sequential data.

Further, as another function which is imparted to the storage device, there has been known an excluding processing function which, when a command of a read request or a write request is given to data stored in a cache memory, performs excluding processing in which a port or a processor in charge of the transmission and reception of the command prevents access by other ports or other processors.

In this case, a following situation arises. In using the storage device to which both of the sequential leaning function and the excluding processing function are imparted as the external storage device and, further, issuing commands sequentially to the external storage device from the main storage device using a plurality of paths, when data to be read is sequential data, data which is read by the cache memory using the sequential learning function depending on the read command transmitted to a certain port cannot be readily read based on a read command transmitted to other port next and hence, the reading of data has to wait for the release of the excluding processing (waiting of the release of the excluding processing).

Further, among the storage devices which are used as the external storage devices, there exists a storage device in which all ports are used in a fully satisfying state and, due to a reason such as the number of processor for executing read processing or write processing corresponding to a command being smaller than the number of ports, when certain port is used, a processing function of other port is lowered.

Accordingly, when the main storage device issues a command to the external storage device, it is desirable to issue the command in a pattern suitable for the function imparted to the external storage device or characteristics of the external storage device, and an I/O performance of the system is considered to be enhanced as a whole by adopting such constitution.

However, in constituting the storage system which includes the host computer, the main storage device and the external storage device, it is cumbersome for a user to completely grasp the functions which are imparted to the respective external storage devices and the characteristics of the respective external storage devices and sets an issuing pattern of a command suitable for the external storage device for every external storage device with respect to the main storage device. Accordingly, if such setting could be performed easily in constituting the storage system, it is considered that the general-use property and availability of the storage system can be enhanced.

The present invention has been made in view of the above-mentioned circumstances and it is an object of the present invention to provide a storage device and a control method thereof which can enhance the general-use property and availability of a storage system while enhancing an I/O performance of the storage system as a whole.

To overcome the above-mentioned drawbacks, according to one aspect of the present invention, there is provided a storage device which virtualizes one or a plurality of logical volumes which an external storage device connected to the storage device offers respectively and offers the virtualized logical volumes to a host computer, wherein the storage device includes a plurality of ports which is connected to the external storage device via respectively different paths, and a channel processor which generates a command corresponding to a read request or a write request given from the host computer, and issues a generated command to the external storage device via any port out of the plurality of ports, and the channel processor is configured, for every kind of the command, to issue a test command to the external storage device in a plurality of issuing methods and to measure an I/O performance for every issuing method, and to display a result of measurement of the I/O performance for every issuing method and/or to set the issuing method in issuing the command to the external storage device based on the result of measurement of the I/O performance for every issuing method.

According to another aspect of the present invention, there is provided a control method of a storage device which virtualizes one or a plurality of logical volumes which an external storage device connected to the storage device offers respectively and offers virtualized logical volumes to a host computer, wherein a function of generating a command corresponding to a read request or a write request given from the host computer, and issuing a generated command to the external storage device via any port out of the plurality of ports which is connected with the external storage device via different paths is imparted to the storage device, and the control method comprises for every kind of the command a first step in which a test command in a plurality of issuing methods is issued to the external storage device and an I/O performance for every issuing method is measured, and a second step in which a result of measurement of the I/O performance for every issuing method is displayed and/or the issuing method in issuing the command to the external storage device is set by the channel processor based on the result of measurement of the I/O performance for every issuing method.

By adopting the storage device and the control method thereof, in constituting the storage system, it is unnecessary for a user to completely grasp functions imparted to the respective external storage devices and characteristics of the respective external storage devices and hence, the user can easily perform setting of an optimum command issuing pattern for every external storage device with respect to the storage device.

According to the present invention, it is possible to enhance the general-use property and the availability of the storage system while enhancing the I/O performance of the storage system as a whole.

Further, the present invention is broadly applicable to any storage device to which an external connection function is imparted.

BRIEF DESCRIPTION OF THE DRAWINGS

FIG. 2 is a schematic view showing a command-issue-pattern management table;

FIG. 3 is a schematic view showing an I/O-performance-test environment-setting management table;

FIG. 4 is a schematic view showing an operation-time command-issue-pattern management table;

FIG. 5 is a schematic view showing a command-issue-order management table;

FIG. 6 is a schematic view showing a volume-priority-port management table;

FIG. 7 is a view showing an I/O-performance-test main screen;

DESCRIPTION OF THE PREFERRED EMBODIMENTS

Hereinafter, one embodiment of the present invention is explained in conjunction with drawings.

(1) Entire Constitution of Storage System According to this Embodiment

Figure 1:
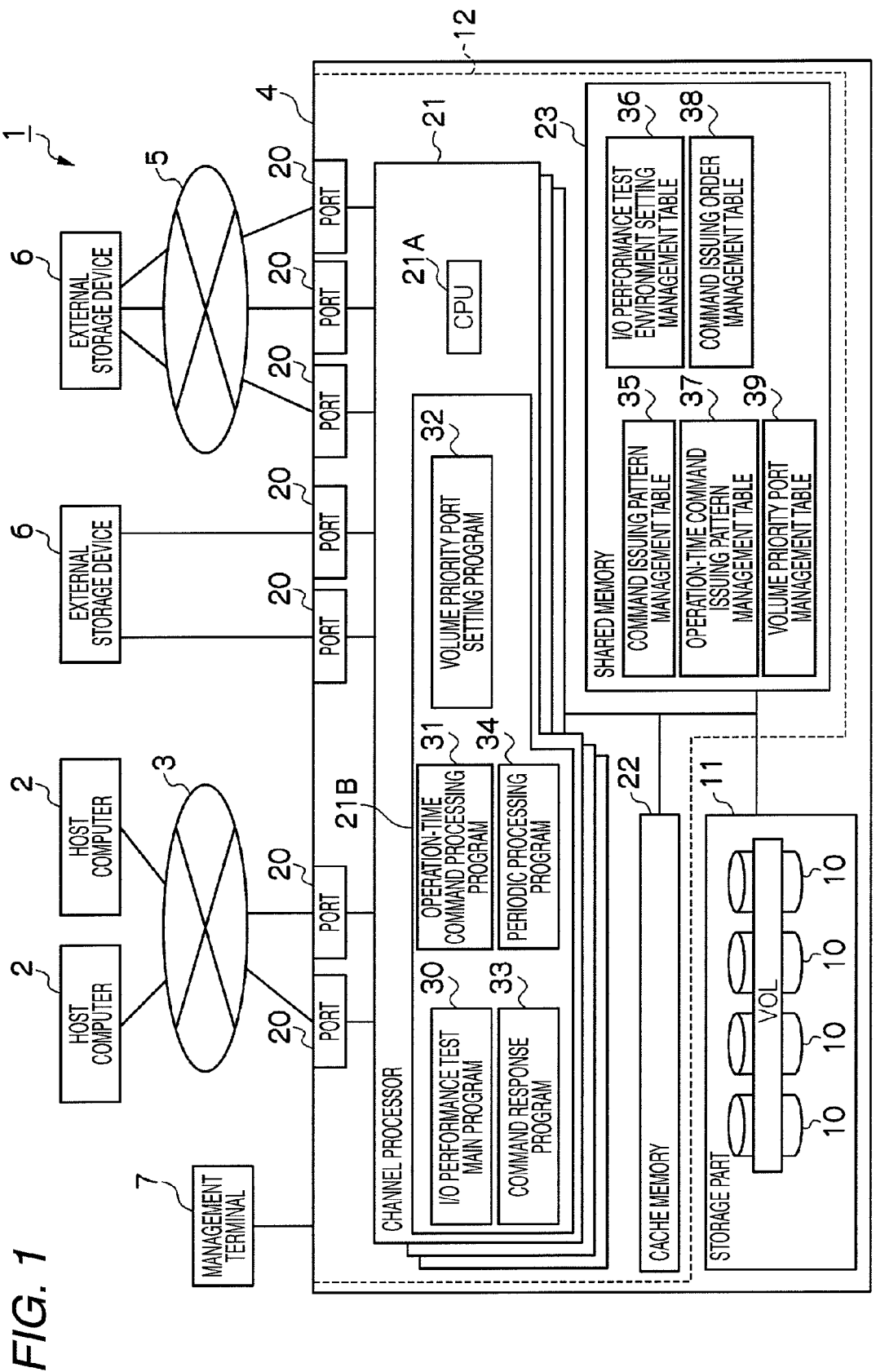
FIG. 1 is a block diagram showing the whole constitution of a storage system according to one embodiment to which the present invention is applied.

In FIG. 1, numeral 1 indicates a storage system according to this embodiment as a whole. In the storage system 1, one or a plurality of host computers 2 is connected to a main storage device 4 via a first network 3 and, at the same time, external storage devices 6 are connected to the main storage device 4 directly or via a second network 5. Further, a management-use terminal 7 is connected to the main storage device 4.

The host computer 2 is a computer apparatus including an information processing resource such as a CPU (Central Processing Unit) or a memory, and is constituted of a personal computer, a work station, a main frame or the like, for example. The host computer 2 includes an information inputting device (not shown in the drawing) such as a keyboard, switches, a pointing device and a microphone and an information outputting device (not shown in the drawing) such as a monitor display and a speaker.

The first and second networks 3, 5 are respectively constituted of a SAN (Storage Area Network), a LAN (Local Area Network), the Internet, public lines, special purpose lines and the like, for example. The communication between the host computer 2 and the main storage device 4 via the first network 3 and the communication between the main storage device 4 and the external storage device 6 are executed in accordance with a fibre channel protocol when the first and second networks 3, 5 are constituted of the SAN, and are executed in accordance with a TCP/IP (Transmission Control Protocol/Internet Protocol) when the first and second networks 3, 5 are constituted of the LAN.

To the main storage device 4, an external connection function which respectively virtualizes one or a plurality of logical volumes which the external storage devices 6 offers to the host computers 2 and offers such virtualized logical volumes to the host computers 2 is imparted. The main storage device 4 is constituted of a storage part 11 which includes a plurality of physical storage devices 10 and a control part 12.

As the physical storage device 10, for example, an expensive disk such as a SCSI (Small Computer System Interface) disk or an inexpensive disk such as a SATA (Serial AT Attachment) disk or an optical disk can be used.

These physical storage devices 10 are operated by the control part 12 using a RAID method. One or a plurality of logical volumes VOL is set in a physical storage area which one or the plurality of physical storage devices 10 provides. Further, data is stored in the physical volumes VOL in accordance with a predetermined-scale block unit (hereinafter, referred to as a logical block).

To the physical volumes VOL, specific identifiers (LUN: Logical Unit Numbers) are respectively given. In this embodiment, inputting and outputting of data are performed by designating addresses, wherein the address is constituted of the combination of the LUN and the number intrinsic to each block (LBA: Logical Block Address).

Here, as the attribute of the logical volume VOL which the main storage device 4 provides, a physical volume and a virtual volume are named. The physical volume is a logical volume having a substance, and the logical volume VOL which is set to the physical storage area which the physical storage device 10 of the storage part 11 provides corresponds to the physical volume.

The virtual volume is a virtual logical volume which does not include a substance, and corresponds to the logical volume VOL set in the main storage device 4 or the logical volume set in the external storage device 6. The external connection function is a function of issuing commands corresponding to a read demand and a write demand from the host computers 2 with respect to the virtual volume to the external storage device 6 having a logical volume corresponding to the virtual volume, and data is read/written in the external storage device with respect to the logical volume. The data read at this point of time is transferred to the host computers 2 via the main storage device 4.

On the other hand, the control part 12 is constituted of a plurality of ports 20, a plurality of channel processors 21, a cache memory 22 and a shared memory 23.

The ports 20 constitute an interface for connecting the control part 12 to the first network 3, the second network 5 or the external storage device 6. An intrinsic network address such as an IP (Internet Protocol) address or a WWN (World Wide Name) is assigned to the individual port 20. The respective ports 20 are connected to the external storage devices 6 via different paths.

The channel processor 21 includes a CPU 21A, an internal memory 21B and the like, and executes necessary processing by interpreting various commands transmitted from the host computers 2 or the external storage devices 6. For example, the channel processor 21, in association with the external connection function, generates a command in response to a read demand or a write demand given from the host computer 2 and issues the generated command to the corresponding external storage device 6 via the corresponding port 20.

The cache memory 22 and the shared memory 23 are memories which are used by the channel processor 21 in common. The cache memory 22 is used mainly for temporarily saving data which is inputted to and outputted from the physical storage devices 10. Further, the shared memory 23 is used mainly for storing system constitution information associated with the entire constitution of the main storage device 4, commands and the like.

The external storage device 6 is constituted of a plurality of physical storage devices and a control part which controls inputting and outputting of data with respect to the physical storage devices. The external storage device 6 has the substantially equal constitution as the main storage device 4 except for a point that the external connection function is not imparted to the external storage device 6 and hence, the detailed explanation of the external storage device 6 is omitted. In this embodiment, each external storage device 6 is connected with the main storage device 4 via a plurality of paths.

The management terminal 7 is a terminal device for controlling an operation of the whole main storage device 4 and, for example, is constituted of a notebook-type personal computer. The management terminal 7 is connected with each channel processor 21 via a LAN not shown in the drawing. The management terminal 7 displays an information screen which displays information collected from the main storage device 4 and various GUI (Graphical User Interface) or transmits a command corresponding to an input from a user using the GUI to the main storage device 4.

(2) I/O Performance Testing Function

Next, the I/O performance testing function imparted to the main storage device 4 is explained. Hereinafter, sequential read and sequential write respectively imply reading and writing of continuous data (sequential data), while random read and random write respectively imply reading and writing of non-continuous (random data) data.

In this storage system 1, the main storage device 4 is provided with the I/O performance testing function which issues test commands to an external storage device 6 which is newly connected to the main storage device 4 in plural kinds of command issuing methods for respective kinds of commands (sequential read command, sequential write command, random read command and random write command), and detects the command issuing method which acquires the best I/O performance in the external storage device 6 for every kind of command.

Here, in this embodiment, as the issuing method of the commands (including the testing command) in the channel processor 21, the first to fourth command issuing methods are preliminarily defined.

Among these first to fourth command issuing methods, the first command issuing method is a command issuing method which allows the transmission of a command to the external storage device 6 via specific ports (hereinafter referred to as priority ports) 20 which are respectively determined for respective logical volumes in the external storage device 6. This command issuing method is effectively applicable when the external storage device 6 has following features.

(a) Even when data of a read object is sequential, when the ports which receive the read command differ from each other, the data of the read object is not determined as the sequential data.

(b) When the excluding processing function is imparted to the external storage device 6, when a plurality of commands which constitutes the sequential data is transmitted to the external storage device 6 via different paths, the excluding release standby occurs.

(c) All ports in the external storage device 6 are not used in a fully sufficient state, and due to a reason such as the number of channel processors being smaller than the number of ports, when one port is used, processing ability of other port is lowered.

The second command issuing method is a command issuing method which sequentially issues commands to the external storage device 6 using one port 20 in the main storage device 4, and changes over the port 20 which performs the transmission of the command and another port when a total amount of data designated to be read or written in response to the command transmitted from the port 20 (hereinafter referred to as a command size) exceeds a predetermined threshold value. The second command issuing method is effectively applicable when the external storage device 6 has none of the above-mentioned features (a) to (c).

Further, the third command issuing method is a command issuing method which is limited to sequential reading and sequential writing. In the same manner as the first command issuing method, the third command issuing method transmits a commands to the external storage device 6 via priority ports 20. However, the third command issuing method differs from the first command issuing method with respect a point that the commands are transmitted to the external storage device 6 at a time after the commands are stored by an amount of a threshold value of the above-mentioned command size. The third command issuing method is effectively applicable when the external storage device 6 has the above-mentioned features (a) to (c) or when the internal processing of each command processing in the external storage device 6 is slow.

The fourth command issuing method is a command issuing method which is, in the same manner as the second command issuing method, limited to sequential reading and sequential writing. The command is issued to the external storage device 6 using one port 20 in the main storage device 4, and when the command size in the port 20 exceeds the above-mentioned threshold value of the command size, the port which performs the transmission of the command is replaced with another port 20. A command issuing pattern of this fourth command issuing method differs from the command issuing pattern of the second command issuing method with respect to a point that the command is transmitted to the external storage device 6 at a time after the command is stored by an amount of a threshold value of the above-mentioned command size. This fourth command issuing method is effectively applicable when the external storage device 6 has no feature to which the second command issuing method is effectively applicable.

Then, the main storage device 4, at the time of performing the I/O performance test based on the I/O performance test function, issues the command using the first to fourth command issuing methods with respect to the sequential read command and the sequential write command, issues the command using the first and second command issuing methods with respect to the random read command and the random write command, and measures the command size of the received command as such a time.

Here, the main storage device 4 performs the I/O performance test with the threshold value of the command size set to "0" MB, "10000000" MB, "20000000" MB and "50000000" MB in the second to fourth command issuing methods with respect to the sequential reading and the sequential writing. Accordingly, in this embodiment, with respect to the sequential reading and the sequential writing, the I/O performance test is performed in 13 kinds of patterns in total consisting of 1 pattern in the first command issuing method and 4 patterns in the second to fourth command issuing methods (hereinafter these patterns being referred to as command issuing patterns respectively).

Further, the main storage device 4 also performs the I/O performance test with the threshold value of the command size set to "0" MB, "10000000" MB, "20000000" MB and "50000000" MB with respect to the random reading and the random writing. Accordingly, in this embodiment, with respect to the random reading and the random writing, the I/O performance test is performed in 5 kinds of patterns in total consisting of 1 pattern in the first command issuing method and 4 patterns in the second command issuing method.

Here, the case in which the command size is "0" MB implies that the command is transmitted to the external storage device 6 by every one command irrespective of a data amount of data of the reading object or writing object designated by one command. For example, in case of the second and fourth command issuing methods, when one command is transmitted, the transmission path moves to a next path (round robin), while in case of the third command issuing method, the transmission of the command is performed in the same manner as the first command issuing method. Accordingly, it is not necessary to set the command size to "0" MB in case of the third and fourth command method.

As a means for performing the above-mentioned I/O performance test, in the internal memory 21B of the channel processor 21, as shown in FIG. 1, an I/O performance test main program 30, an operation-time command processing program 31, a volume priority port setting program 32, a command response program 33 and a periodic processing program 34 are installed. In the shared memory 23, a command issuing pattern management table 35, an I/O performance test environment setting management table 36, an operation-time command issuing pattern management table 37, a command issuing order management table 38, and a volume priority port management table 39 are stored.

Among these programs, the I/O performance test main program 30 is a main program for performing the above-mentioned I/O performance test, and the operation-time command processing program 31 is a program for performing command processing in which the channel processor 21 issues a necessary command to the external storage device 6 at the time of performing a usual operation of the storage system 1.

Further, the volume priority port setting program 32 is a program for setting the priority port 20 which is used at the time of issuing the command to the external storage device 6 in the above-mentioned first or third command issuing method at the time of performing the I/O performance test or the usual operation for every logical volume in the external storage device 6.

Further, the command response program 33 is a program for performing the command response processing when a response from the external storage device 6 is received with respect to a command issued to the external storage device 6, and the periodic processing program 34 is a program for changing over the port 20 which issues a command when the command is issued to the external storage device 6 in the above-mentioned second or fourth command issuing method at the time of performing the I/O performance test or the usual operation.

On the other hand, the command issuing pattern management table 35 is a table for setting the command issuing patterns and managing the test result of the I/O performance test. As shown in FIG. 2, the command issuing pattern management table 35 is constituted of an external storage kind column 35A, a command issuing pattern number column 35B, a command issuing method column 35C, a command size column 35D and a measurement result column 35E.

Then, in the external storage kind column 35A, kind (identification information) of the external storage device 6 which becomes a testing object of the I/O performance test is stored. Further, in the command issuing method column 35C, the command issuing methods (first to fourth command issuing methods) corresponding to the row (the entry) are stored. In the example shown in FIG. 2, "A" to "D" respectively correspond to the first to fourth command issuing methods. Further, in the command size column 35D, a threshold value of the command size in the command issuing pattern corresponding to the row is stored.

Further, in this embodiment, as described above, there are provided 13 kinds of command issuing patterns due to the combination of the command issuing methods (first to fourth command issuing methods) and the threshold values of the command size ("0" MB, "10000000" MB, "20000000" MB and "50000000" MB). The numbers which are respectively assigned to these command issuing patterns (hereinafter referred to as pattern numbers) are stored in the command issuing pattern number column 35B.

The measurement result column 35E is constituted of a sequential read column 35F, a sequential write column 35G, a random read column 35H and a random write column 35I. These sequential read column 35F, the sequential write column 35G, the random read column 35H and the random write column 35I are respectively constituted of valid/invalid column 35FA, 35GA, 35HA, 35IA and a measurement result storage column 35FB, 35GB, 35HB, 35IB.

Then, in the valid/invalid column 35FA, 35GA, 35HA, 35IA, information indicative of whether or not the command issuing pattern of the entry is valid with respect to the command kind (sequential read command, sequential write command, random read command or random write command) corresponding to the sequential read column 35F, the sequential write column 35G, the sequential random column 35H and the random write column 35I is stored ("Yes" when valid and "No" when invalid).

Further, in the measurement result storage column 35FB, 35GB, 35HB, 35IB, the measurement result which is acquired when the command is issued in the command issue pattern corresponding to the row in the I/O performance test. For example, in the measurement result storage column 35FA of the sequential read column 35F on the third row from above in FIG. 2 and in the measurement result storage column 35GB of the sequential write column 35G on the same row, a total amount of data read or written eventually when the command size of the sequential read command or the sequential write command is "10000000" MB is stored. Further, in the measurement result storage column 35HB of the random read column 35H on the same row and in the measurement result storage column 35IB of the random write column 35I on the same row in the command issuing pattern management table 35 shown in FIG. 2, the command numbers eventually processed when the command size of the random read command or the random write command is "10000000" MB are respectively stored.

On the other hand, the I/O performance test environment setting management table 36 is a table for managing conditions of the above-mentioned I/O performance test which are preliminarily set for every external storage device 6 and, at the same time, for every kind of command. As shown in FIG. 3, the I/O performance test environment setting management table 36 is constituted of an external storage kind column 36A, a command kind column 36B, a test time column 36C, an external storage issuing LU number column 36D, a command issuing size column 36E and a use port column 36F.

Then, in the external storage kind column 36A, the identification information of the external storage device 6 which becomes an object of the I/O performance test is stored, while in the command kind column 36B, the command kind of command issued to the corresponding external storage device 6 at the time of performing the I/O performance test is stored.

Further, in the test time column 36C, time (test time) during which the I/O performance test based on the command of the command kind is performed is stored. The logical volume number necessary for issuing the corresponding command of the command kind at the time of performing the I/O performance test is stored in the external storage issuing LU number column 36D.

Further, in the command issuing size column 36E, a data amount of reading or writing which can be requested with one command is stored. In the use port column 36F, a port ID of the port 20 which is used in transmitting the corresponding command of command kind to the external storage device 6 which constitutes a test object is stored.

On the other hand, the operation-time command issuing pattern management table 37 is a table for managing a command issuing pattern which is set as a command issuing pattern to be used at the time of usual operation for every external storage device 6 and for every command kind based on the above-mentioned I/O performance test. As shown in FIG. 4, the operation-time command issuing pattern management table 37 is constituted of an external storage kind column 37A, a command kind column 37B, a command issuing pattern number column 37C and an operation time column 37D.

In the external storage kind column 37A, identification information of the external storage device 6 which is connected to the main storage device 4 is stored. In the command kind column 37B, command kinds of commands which can be issued to the external storage device 6 are stored. Further, in the command issuing pattern number column 37C, the pattern numbers of the command issuing patterns set as command issuing patterns used at the time of performing the usual operation with respect to the corresponding command kinds are stored. Here, the pattern numbers stored in the command issuing pattern number column 37C correspond to the pattern numbers which are stored in the command issuing pattern number column 35B of the above-mentioned command issuing pattern management table 35 explained previously in conjunction with FIG. 2.

Accordingly, in the example shown in FIG. 4, a candidate number "11" is stored in the command issuing pattern number column of the first row and hence, the sequential read of the external storage device 6 "Hitachi USP (1111)" indicates that the command issuing pattern which reads data of "10000000" MB per 1 second by the fourth command issuing method (see FIG. 2) is set as the command issuing pattern at the time of performing the usual operation.

Further, in the operation time column 37D, a point of time or a time span within which the command issuing pattern which stores the pattern number in the command issuing pattern number column 37C is to be applied is stored. In FIG. 4, "default" implies that the corresponding command issuing pattern is to be used in principle at the time of issuing the command of command kind corresponding to the corresponding external storage device 6.

However, in this embodiment, as described later, the user can designate a time span and can set a desired command issuing pattern as the command issuing pattern in the time span. Accordingly, in such a case, the time span is stored in the operation time column 37D. When the time span is stored in the operation time column 37D, in such a time span, the priority in use is assigned to the command issuing pattern stored in the command issuing pattern number column 37C on the same row.

For example, in the case shown in FIG. 4, with respect to the external storage device 6 referred to as "Hitachi USP (1111), the command issuing pattern having the pattern numbers of "11", "11", "2" and "2" are usually respectively set as the command issuing patterns of the sequential read, sequential write, random read and random write. However, within the time span of "0:00 to 6:00", the command issuing pattern having the pattern number of "13" is usually set as the command issuing pattern of the sequential read and the sequential write, and the command issuing pattern having the pattern number of "5" is usually set as the command issuing pattern of the random read and the random write. Further, on Sunday of every week, the command issuing pattern having the pattern number of "13" is usually set as the command issuing pattern of the sequential read and the sequential write, and the command issuing pattern having the pattern number of "5" is usually set as the command issuing pattern of the random read and the random write.

The command issuing order management table 38 is a table for managing a cumulative size of data to be read or written based on the command transmitted via one port 20 at the time of performing the I/O performance test or the usual operation (hereinafter referred to as command transmission cumulative size). The command issuing order management table 38 is constituted of an external storage kind column 38A, a LUN column 38B, a command kind column 38C, a transmission port ID column 38D, a start LBA column 38E, a total size column 38F, and a start time column 38G.

Here, in the external storage kind column 38A, identification information of the external storage device 6 which constitutes the transmission destination of the command is stored. In the LUN column 38B, among the logical volumes in the external storage device 6, a LUN of the logical volume which is set as an address of the command or is scheduled to set as the address of the command is stored.

Further, in the command kind column 38C, the command kind of the command which is transmitted or is scheduled to be transmitted is stored. In the transmission port ID column 38D, a port ID of the port 20 which is used or is scheduled to be used for transmitting the command is stored. Further, in the start LBA column 38E, the LBA which is designated as the read destination or the write destination of data by the first command when the use of the port 20 is started is stored. In the total size column 38F, a total size of the data to be read or written based on the command transmitted using the port 20 is stored. Further, in the start time column 38G, a use start time of the port 20 is stored.

The volume priority port management table 39 is a table for managing the priority ports 20 which are respectively preliminarily set by the user with respect to the respective logical volumes of each external storage device 6. As shown in FIG. 6, the volume priority port management table 39 is constituted of an external storage kind column 39A, a LUN column 39B and a priority port ID column 39C.

In the external storage kind column 39A, the identification information of the external storage device 6 which becomes an object is stored. In the LUN column 39B, among the logical volumes provided in the external storage device 6, the LUN of the logical volume virtualized by the main storage device 4 is stored. Further, in the priority port ID column 39C, a port ID of the priority port 20 set with respect to the corresponding logical volume is stored.

(3) Constitution of GUI Screen on I/O Performance Test

FIG. 7 shows an I/O performance test main screen 40 which is displayed on the management terminal 7 in association with the I/O performance test. The I/O performance test main screen 40 is a screen which can be displayed on the management terminal 7 when the user selects the external storage device 6 which becomes an object of the I/O performance test by operating the management terminal 7.

The I/O performance test main screen 40 includes an I/O performance test result display part 41 on a center portion thereof. On this I/O performance test result display part 41, a content of the respective command issuing patterns set at such a point of time, and a test result of the I/O performance test which is performed in advance with respect to the external storage device 6 selected as a test object of the I/O performance test at such a point of time are displayed.

To be more specific, on the I/O performance test result display part 41, among entries of the command issuing pattern management table 35 (FIG. 2), the information stored in the command issuing pattern number column 35B, the command issuing method column 35C, the command size column 35D and the measurement result column 35E of each entry in which identification information of the external storage device 6 selected at this point of time stored in the external storage kind column 35A is displayed.

Further, around the I/O performance test result display part 41, a new addition button switch 42, an edition button switch 43, a performance graph button switch 44, a measurement start button switch 45, a measurement environment setting button switch 46 and a finish button switch 47 are displayed.

Further, with respect to the I/O performance test main screen 40, by clicking the new addition button switch 42, it is possible to additionally register a new command issuing pattern by self definition to the I/O performance test result display part 41 in addition to the command issuing patterns already registered in the I/O performance test result display part 41 at this point of time (13 patterns in an initial state in this embodiment). Further, by clicking the edition button switch 43, it is possible to edit contents of the respective already-set command issuing patterns at this point of time.

Figure 8:
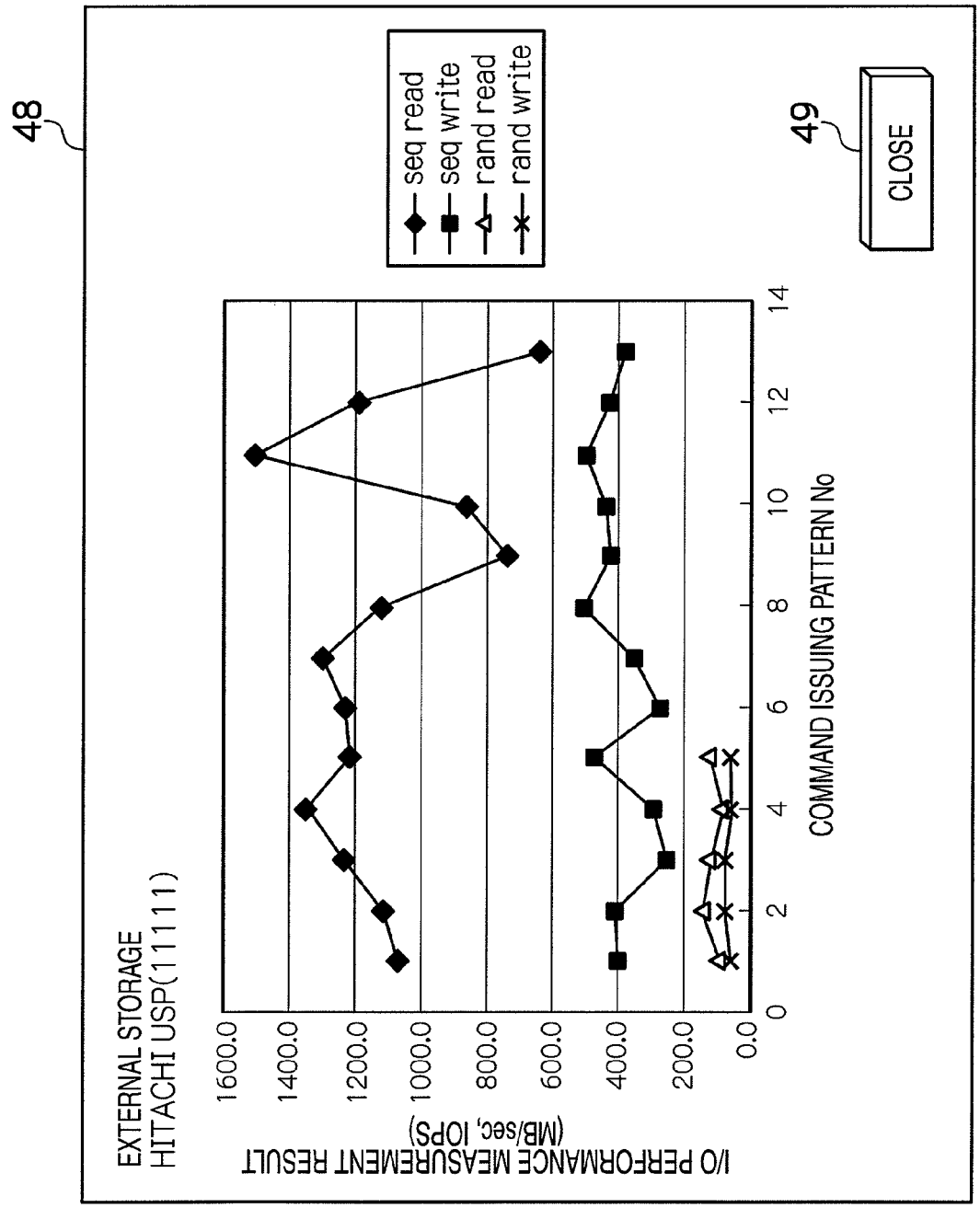
FIG. 8 is a view showing an I/O-performance-test-graph display screen.

Further, on the I/O performance test main screen 40, by clicking the performance graph button switch 44, it is possible to display an I/O performance test graph display screen 48 shown in FIG. 8 which displays a test result of the I/O performance test displayed as a graph on the I/O performance test result display part 41. By clicking the measurement environment setting button switch 46, it is possible to display a measurement environment setting screen 50 shown in FIG. 9.

Further, on the I/O performance test main screen 40, by clicking the measurement start button switch 45, it is possible to start the I/O performance test with respect to the external storage device 6 selected as a testing object of the I/O performance test at this point of time. Further, a test result of the I/O performance test performed at this point of time is displayed on the I/O performance test result display part 41 of the I/O performance test main screen 40 and, at the same time, the test result is reflected on the above-mentioned command issuing pattern management table 35 explained previously in conjunction with FIG. 2.

Figure 10:
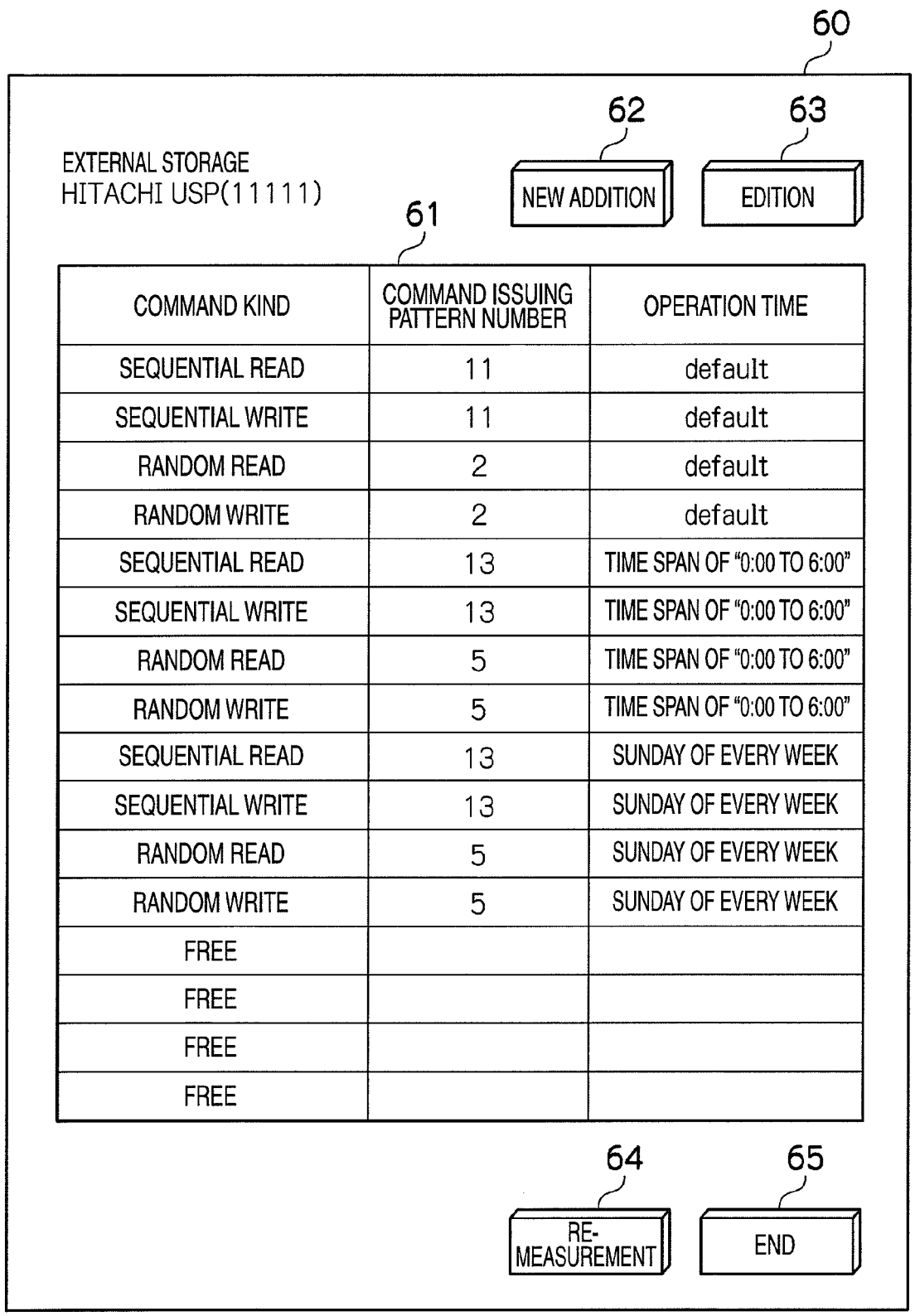
FIG. 10 is a view showing an operation-time command-issue-pattern management screen.

Further, on the I/O performance test main screen 40, by clicking the finish button switch after finishing of the I/O performance test, it is possible to display an operation-time command issuing pattern management screen 60 shown in FIG. 10.

Figure 9:
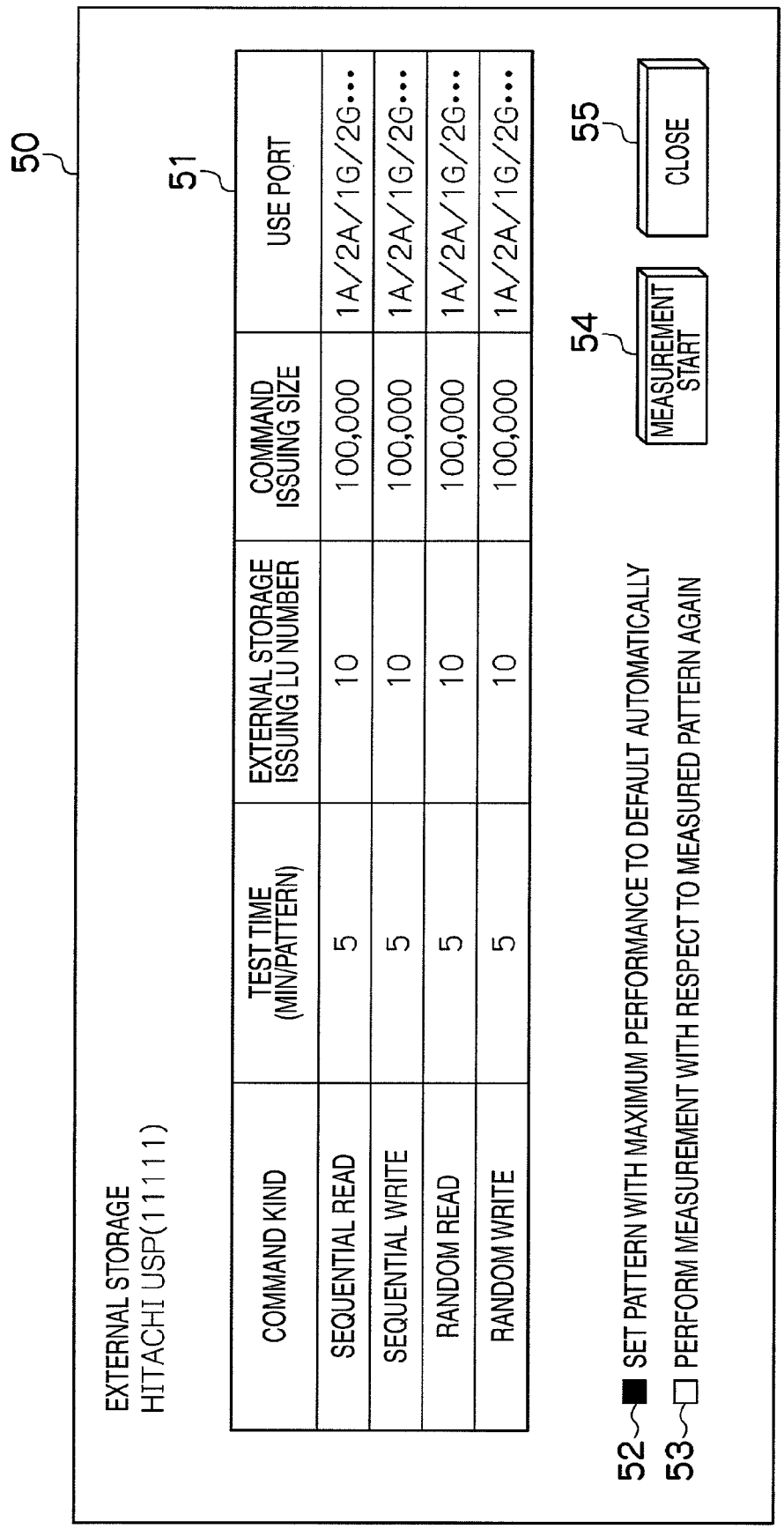
FIG. 9 is a view showing a measurement-environment setting screen.

FIG. 9 shows the measurement environment setting screen 50 which is displayed by clicking the measurement environment setting button switch 46 on the I/O performance test main screen 40. The measurement environment setting screen 50 is a screen for setting a measurement environment (test time, external storage issuing LU number, command issuing size and using ports for every command kind) with respect to the external storage device 6 selected at this point of time.

In an actual operation, a measurement environment setting part 51 having the substantially equal constitution as the above-mentioned I/O performance test environment setting management table 36 explained previously in conjunction with FIG. 3 is displayed on a center portion of the measurement environment setting screen 50. By making use of this measurement environment setting part 51, the user can set the test time, the external storage issuing LU number, the command issuing size and the using ports for every command kind respectively. Then, the test time, the external storage issuing LU number, the command issuing size and the using ports for every command kind with respect to the external storage device 6 which are set at this point of time are registered in and managed by the I/O performance test environment setting management table 36.

Further, on the measurement environment setting screen 50, the user can set "A pattern having the maximum performance is automatically set to a default setting" at his/her choice. When the user fills a check in a check box 52 corresponding to such setting, for every command kind, a command issuing pattern which acquires the best I/O performance in the I/O performance test performed after such checking is set as the default command issuing pattern.

Further, on the measurement environment setting screen 50, the user can set "Measurement is performed again also with respect to the measured pattern" at his/her will. When the user fills a check in a check box 53 corresponding to such setting, at the time of performing the I/O performance test, tests are performed with respect to all command kinds in all command issuing patterns. Further, when the user does not fill a check in the check box 53 corresponding to such setting, the I/O performance test is not performed with respect to the command issuing pattern which is already subject to the I/O performance measurement and the I/O performance test is performed only with respect to newly-set command issuing patterns or the command issuing patterns whose conditions are edited.

Further, on the measurement environment setting screen 50, a measurement start button switch 54 and a closing button switch 55 are also displayed. On the measurement environment setting screen 50, by clicking the measurement start button switch 54, it is possible to start the I/O performance test with respect to the external storage device 6 selected at this point of time. By clicking the closing button switch 55, it is possible to close the measurement environment setting screen 50.

On the other hand, FIG. 10 shows an operation-time command issuing pattern management screen 60 which is displayed when the finish button switch 47 on the I/O performance test main screen 40 is clicked after the I/O performance test with respect to the external storage device 6 is finished. The operation-time command issuing pattern management screen 60 is a screen for allowing the user to set and manage the command issuing patterns which are respectively used for respective command kinds at the time of performing a usual operation with respect to the external storage device 6 selected as a test object of the I/O performance test.

A set command issuing pattern display part 61 is displayed on a center portion of this operation-time command issuing pattern management screen 60. Within the set command issuing pattern display part 61, the command issuing patterns for respective command kinds set with respect to the currently corresponding external storage device 6 are displayed.

For example, in the example shown in FIG. 10, the external storage device 6 which is selected as the test object of the I/O performance test is "HITACHI USP (1111)". This "HITACHI USP (1111)" implies that, with respect to the external storage device 6, the command issuing patterns having a candidate number of "11" are respectively set as "default" command issuing patterns on sequential read and sequential write, and the command issuing patterns having a candidate number of "2" are respectively set as "default" command issuing patterns on random read and random write.

Further, on the operation-time command issuing pattern management screen 60, a new addition button switch 62, an edition button switch 63, a re-measurement button switch 64 and a finish button switch 65 are displayed at positions above and below the set command issuing pattern display part 61.

By clicking the new addition button switch 62, the user can define and register a new command issuing pattern as the command issuing pattern for every command kind with respect to the external storage device 6 which constitutes the object at this point of time. To be more specific, the user can input a pattern number of the desired command issuing pattern and a time span to which the command issuing pattern is applied with respect to the desired command kind in the set command issuing pattern display part 61. Then, the registered content at this point of time is reflected on the above-mentioned operation-time command issuing pattern management table 37 shown in FIG. 4.

Further, by clicking the edition button switch 63, the user can edit the setting which is already displayed on the set command issuing pattern display part 61. By clicking the re-measurement button switch 64, the user can make the main storage device 4 to perform the I/O performance test with respect to the external storage device 6. When the set command issuing pattern display part 61 is changed due to such edition and re-testing of the I/O performance test with respect to the external storage device 6 at this point of time, the changed content is reflected on the operation-time command issuing pattern management table 37. Further, the user can close the operation-time command issuing pattern management screen 60 by clicking the finish button switch 65.

Figure 11:
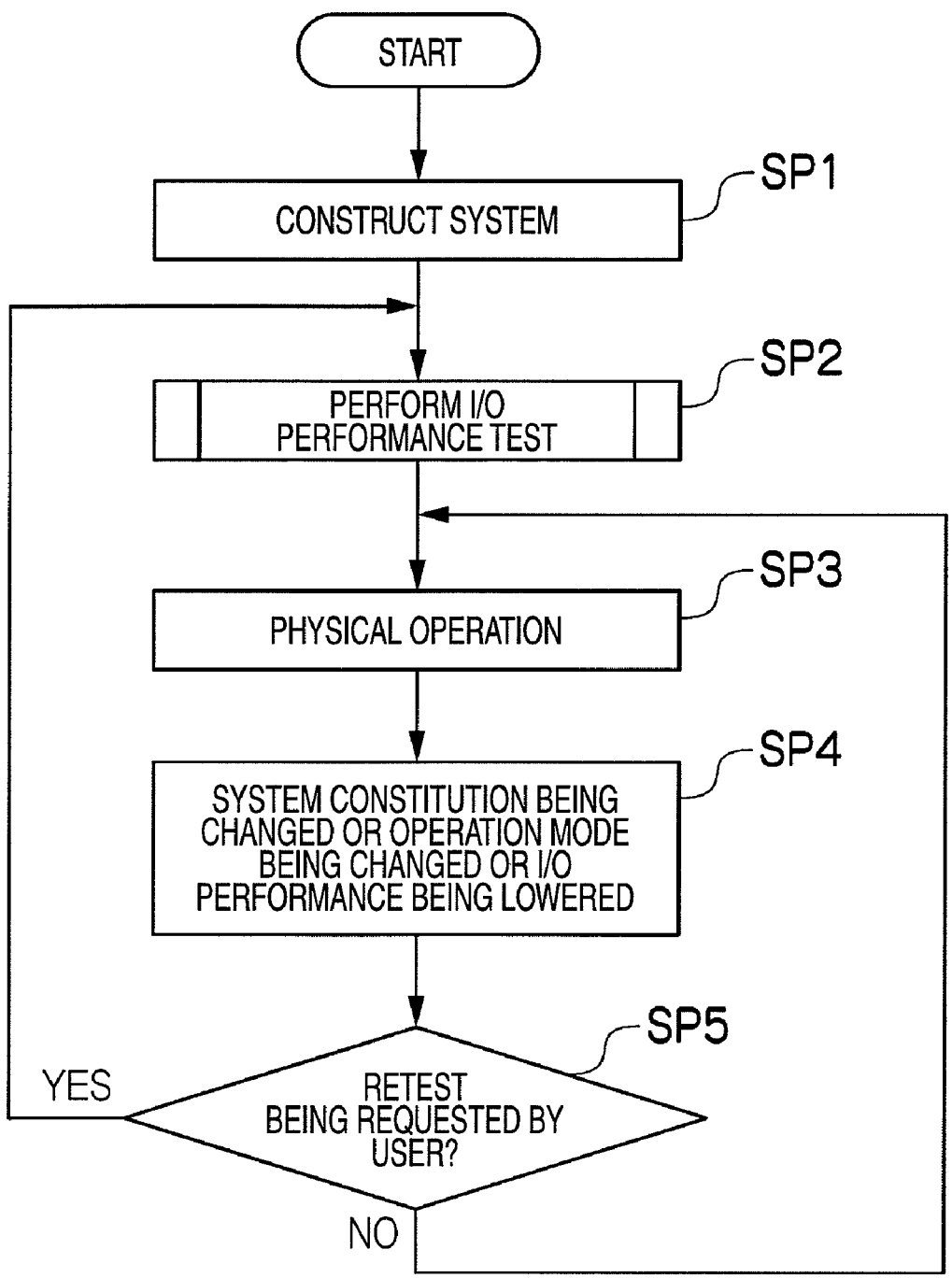
FIG. 11 is a flowchart showing the flow of procedure or processing on an I/O performance test and an actual operation of the storage system according to an embodiment.

(4) Various Processing on the I/O Performance Test Functions (4-1) Flow of Procedure on I/O Performance Test FIG. 11 shows the flow of procedure and processing on the I/O performance test and an actual operation of this storage system 1.

In performing the I/O performance test, the user, first of all, constructs the storage system 1 (SP1). The construction of the storage system 1 includes the connection among the host computers 2, the main storage device 4 and the external storage devices 6. Further, the construction of the storage system 1 includes setting of virtual volumes in the main storage device 4, setting of logical volumes in the external storage device 6, mapping between the virtual volumes and the logical volumes, and the setting of priority ports 20 for every logical volume in the external storage device 6 explained previously in conjunction with FIG. 6.

Next, the user performs the I/O performance test with respect to the respective external storage devices 6 connected to the main storage device 4 by operating the management terminal 7. The I/O performance test is performed for every external storage device 6. In this storage system 1, based on a result of the I/O performance test, an optimum command issuing pattern for every command kind is set in the main storage device 4 for every external storage device 6 (SP2).

Then, the operation of the storage system 1 is started (SP3). During the operation of the storage system 1, in issuing a command to the external storage devices 6, the main storage device 4 issues the command in a command issuing pattern set in step SP2 or set by the user.

Thereafter, when the system constitution of the storage system 1 is changed, when an operation mode of the storage system 1 is changed or when the I/O performance of the external storage device 6 is lowered (SP4), the user can again perform the I/O performance test with respect to the external storage device 6 designated by operating the management terminal 7 (SP4, SP5). As a result, the optimum command issuing pattern for the new system constitution or the new operation mode is detected again and is set in the main storage device 4.

(4-2) Processing Content of Management Terminal on I/O Performance Test

Figure 12:
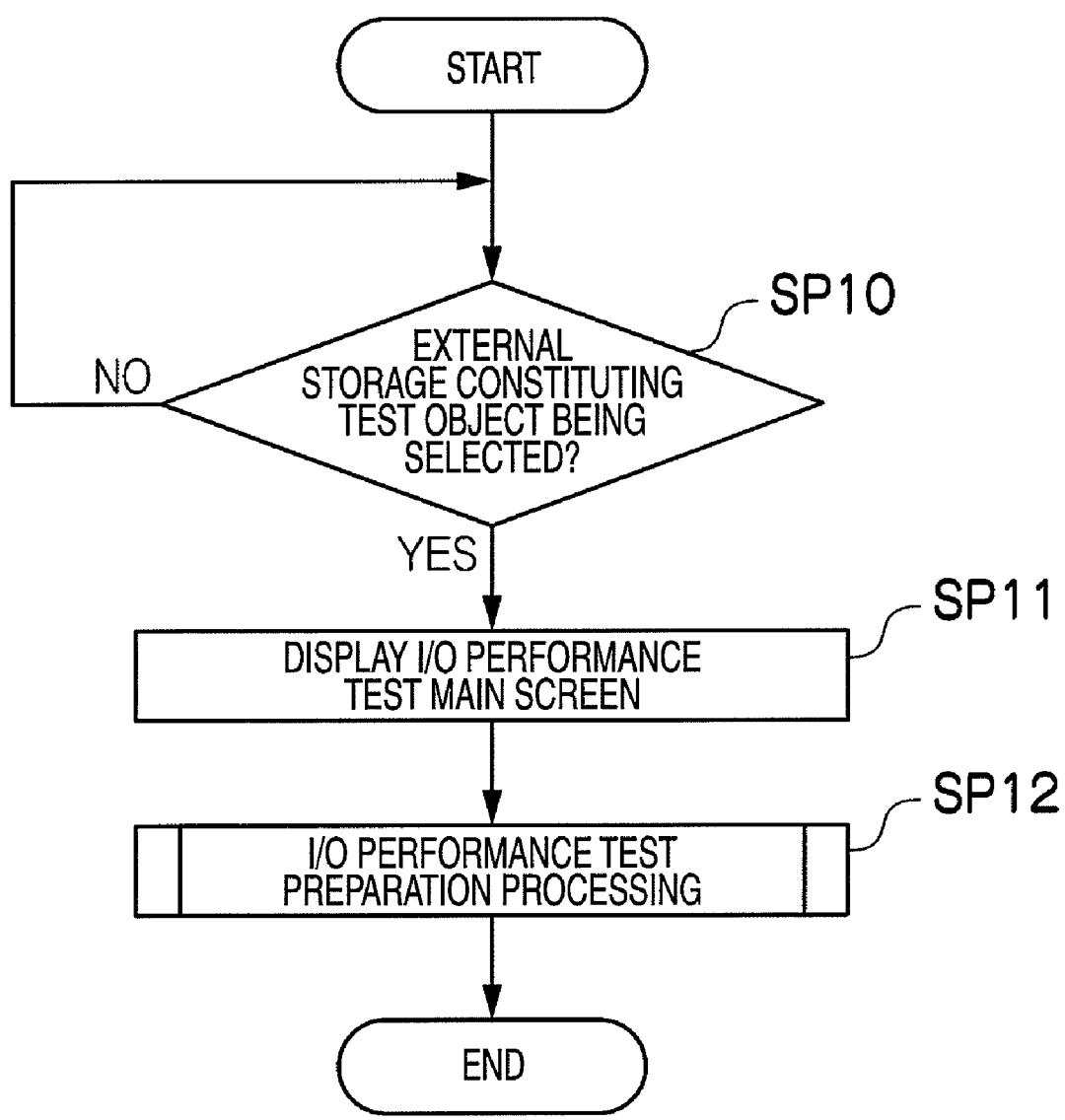
FIG. 12 is a flowchart showing steps of I/O performance test main processing.

FIG. 12 shows I/O test main processing which the management terminal 7 executes in step SP2 shown in FIG. 11. In step SP2 shown in FIG. 11, the user, first of all, starts a program on the I/O performance test by operating the management terminal 7.

When such a program is started, the management terminal 7 starts the I/O performance test main processing shown in FIG. 12 in accordance with the program. First of all, the management terminal 7 waits for the selection of the external storage device 6 which constitutes a test object of the I/O performance test by the user (SP10).

When the external storage device 6 which constitutes the test object is selected later, the management terminal 7 reads, among respective entries of the command issuing pattern management table 35 (FIG. 2) stored in the shared memory 23 (FIG. 1) of the main storage device 4, information of all entries stored in the external storage kind column 35A containing the same identification information as the external storage device 6 selected at this point of time from the command issuing pattern management table 35, and displays the above-mentioned I/O performance test main screen 40 explained previously in conjunction with FIG. 7 based on the read information (SP11).

Next, the management terminal 7, in response to the user operation on the I/O performance test main screen 40, executes the preparation processing for the I/O performance test (hereinafter referred to as I/O performance test preparation processing) (SP12) and, thereafter, finishes the I/O performance test main processing.

Figure 13:
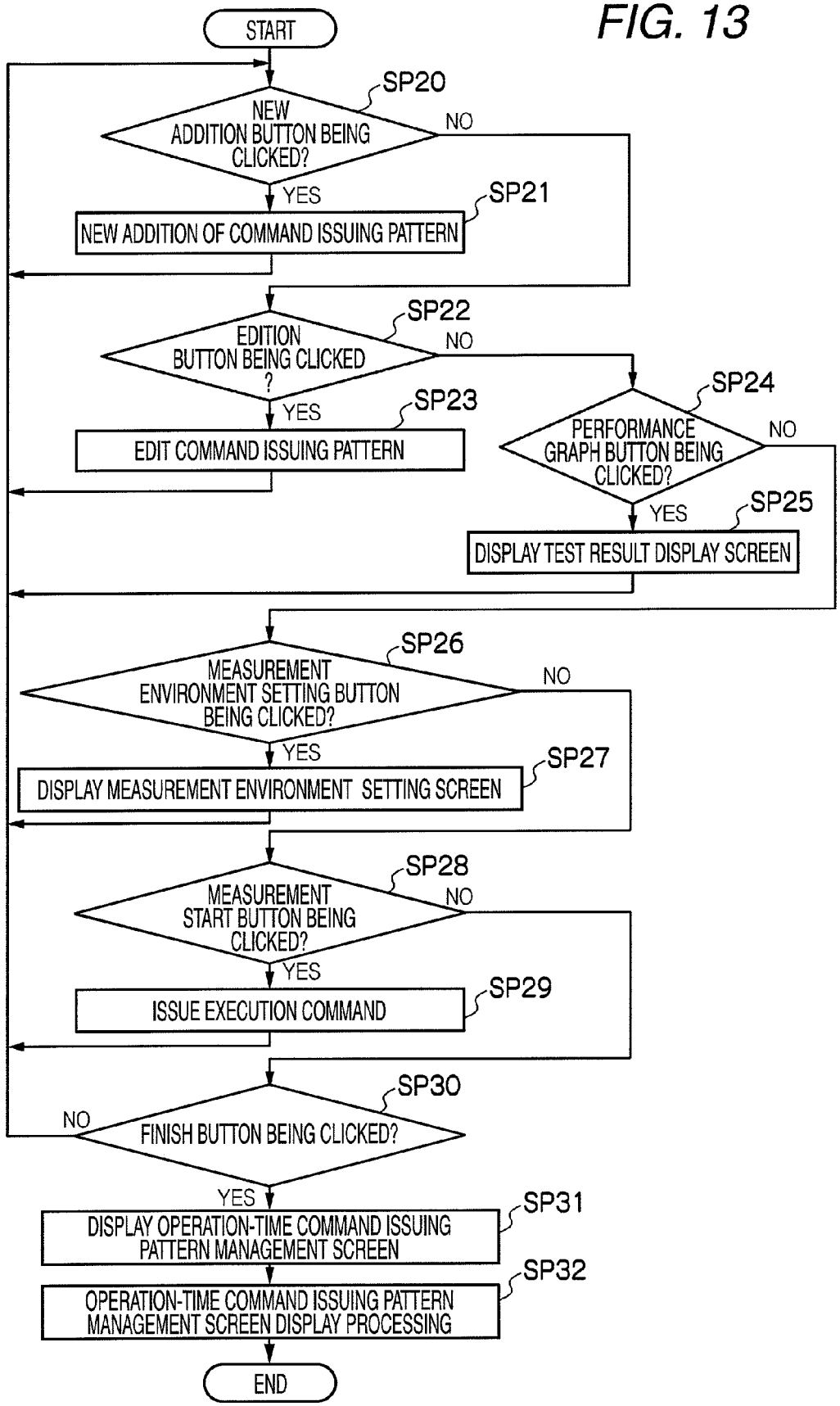
FIG. 13 is a flowchart showing steps of I/O performance test preparation processing.

Here, the specific processing content of the management terminal 7 in step SP12 of the I/O performance test main processing is shown in FIG. 13.

When the management terminal 7 advances to step SP12 of the I/O performance test main processing, the management terminal 7 starts the I/O performance test preparation processing shown in FIG. 13 and, first of all, determines whether or not the new addition button switch 42 on the I/O performance test main screen 40 is clicked (SP20).

Then, when the management terminal 7 obtains an affirmative result in this determination, thereafter, the management terminal 7 additionally registers the new command issuing pattern (command issuing method and size) which the user defines in the I/O performance test result display part 41 of the I/O performance test main screen 40 and, at the same time, also additionally registers this command issuing pattern in the command issuing pattern management table 35 (FIG. 2). Further, the management terminal 7, thereafter, repeats the similar processing until the new addition button switch 42 is clicked again (SP21). Then, the management terminal 7 returns to step SP20 when the new addition button switch 42 is clicked later.

On the other hand, when the management terminal 7 obtains a negative result in the determination in step SP20, the management terminal 7 determines whether or not the edition button switch 43 on the I/O performance test main screen 40 is clicked (SP22).

Then, when the management terminal 7 obtains an affirmative result in this determination, thereafter, the management terminal 7 changes the definition of the command issuing pattern registered in the I/O performance test result display part 41 on the I/O performance test main screen 40 in accordance with an operation of the user and this change is also reflected on the command issuing pattern management table 35 (FIG. 2). Thereafter, the management terminal 7 repeats the similar processing until the edition button switch 43 is clicked again (SP23). Then, the management terminal 7 returns to step SP20 when the edition button switch 43 is clicked later.

On the other hand, when the management terminal 7 obtains a negative result in the determination in step SP22, the management terminal 7 determines whether or not the performance graph button switch 44 on the I/O performance test main screen 40 is clicked (SP24).

Then, when the management terminal 7 obtains an affirmative result in this determination, the management terminal 7 makes a graph as shown in FIG. 8 based on a test result of the preceding I/O performance test displayed in the I/O performance test result display part 41 on the I/O performance test main screen 40 and displays the graph as the I/O performance test graph display screen 48. Further, the management terminal 7, thereafter, returns to step SP20 when a closing button switch 49 (FIG. 8) in the I/O performance test graph display screen 48 is clicked.

Further, when the management terminal 7 obtains a negative result in the determination in step SP24, the management terminal 7 determines whether or not the measurement environment setting button switch 46 on the I/O performance test main screen 40 is clicked (SP26).

Further, when the management terminal 7 obtains an affirmative result in this determination, the management terminal 7 reads the I/O performance test environment setting management table 36 stored in the shared memory 23 in the main storage device 4 and displays the measurement environment setting screen 50 shown in FIG. 9 based on the I/O performance test environment setting management table 36. Further, the management terminal 7, thereafter, changes the display content displayed in the measurement environment setting part 51 on the measurement environment setting screen 50 in accordance with an operation of the user and this change is also reflected on the I/O performance test environment setting management table 36. Thereafter, when the closing button switch 56 (FIG. 9) on the measurement environment setting screen 50 is clicked, the management terminal 7 closes the measurement environment setting screen 50 and returns to step SP20.

Further, when the management terminal 7 obtains a negative result in the determination in step SP26, the management terminal 7 determines whether or not the measurement start button switch 45 on the I/O performance test main screen 40 is clicked (SP28).

Further, when the management terminal 7 obtains an affirmative result in this determination, the management terminal 7 transmits an I/O performance test performing command to the main storage device 4 for instructing the main storage device 4 to perform the I/O performance test (SP29) and, thereafter, the management terminal 7 returns to step SP20.

Further, when the management terminal 7 obtains a negative result in the determination in step SP28, the management terminal 7 determines whether or not the finish button switch 47 on the I/O performance test main screen 40 is clicked (SP30). Then, when the management terminal 7 obtains a negative result in this determination, the management terminal 7 returns to step SP20 and, thereafter, repeats the processing from step SP20 to step SP30 until the management terminal 7 obtains an affirmative result in step SP30.

Then, when the management terminal 7 obtains an affirmative result in step SP30 in accordance with clicking of the finish button switch 47 later, the management terminal 7 displays the operation-time command issuing pattern management screen 60 explained previously in conjunction with FIG. 10 (SP31).

Further, the management terminal 7, thereafter, additionally registers conditions which allows the application of the new command issuing pattern in the set command issuing pattern display part 61 or updates such application conditions of the existing command issuing pattern displayed on the set command issuing pattern display part 61 when necessary based on an operation of the user performed on the operation-time command issuing pattern management screen 60. Then, when the management terminal 7 additionally registers the application conditions of a new command issuing pattern in the set command issuing pattern display part 61 or updates the application conditions of the existing command issuing pattern, the additional registration or the updating of the application conditions of the command issuing pattern is reflected on the operation-time command issuing pattern management table 37 (FIG. 4) (SP32).

Then, when the finish button switch 65 (FIG. 10) on the operation-time command issuing pattern management screen 60 is clicked later, the management terminal 7 finishes the I/O performance test preparation processing.

(4-3) Processing Content of Channel Processor on I/O Performance Test Function

Figure 14:
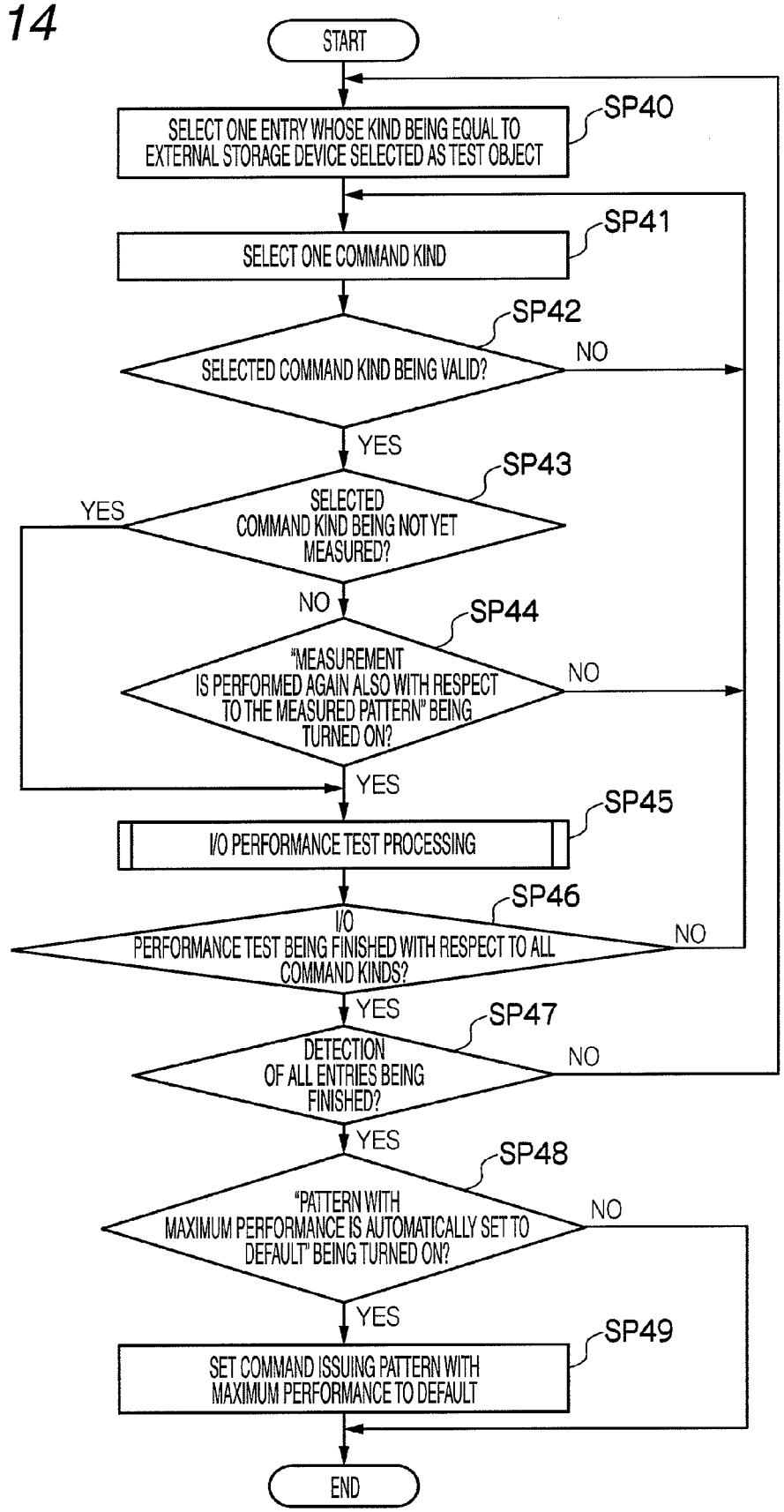
FIG. 14 is a flowchart showing steps of I/O performance test performing processing.

On the other hand, FIG. 14 shows processing content of the channel processor 21 (FIG. 1) of the main storage device 4 on the I/O performance test function.

The channel processor 21 of the main storage device 4 which receives the I/O performance test performing command transmitted from the management terminal 7 in step SP29 shown in FIG. 13 performs an I/O performance test with respect to the external storage device 6 selected by the user in step SP10 in FIG. 12 based on the I/O performance test main program 30 (FIG. 1) stored in the internal memory 21B (FIG. 1).

That is, when the channel processor 21 receives the I/O performance test performing command transmitted from the management terminal 7, the channel processor 21 starts the I/O performance test performing processing shown in FIG. 14. First of all, among entries (rows) of the command issuing pattern management table 35 (FIG. 2) stored in the shared memory 23 (FIG. 1), the channel processor 21 selects one entry in which the identification information of the external storage device 6 designated in the I/O performance test performing command is stored in the external storage kind column 35A (FIG. 2) (SP40).

Subsequently, the channel processor 21 selects one command kind with which the I/O performance test is performed out of sequential read, sequential write, random read and random write (SP41) and, thereafter, by looking up the command issuing pattern management table 35, determines whether or not the command kind selected in step SP41 is valid with respect to the entry selected in step SP40 (SP42).

Then, when the channel processor 21 obtains a negative result in this determination, the channel processor 21 returns to SP41, while when the channel processor 21 obtains an affirmative result, by looking up the command issuing pattern management table 35, the channel processor 21 determines whether or not an I/O performance test with respect to the command kind selected in step SP41 is not yet performed (non-measured state) (SP43).

When the channel processor 21 obtains an affirmative result in this determination, the channel processor 21 advances to step SP45, while when the channel processor 21 obtains a negative result, the channel processor 21 determines whether or not a check is filled in the check box 53 which corresponds to an item: "Measurement is performed again also with respect to the measured pattern" on the measurement environment setting screen 50 explained previously in conjunction with FIG. 9 (SP44).

When the channel processor 21 obtains a negative result in this determination, the channel processor 21 returns to step SP41, while when the channel processor 21 obtains an affirmative result, the channel processor 21 executes the I/O performance test with the command kind selected in step SP41 in the command issuing pattern corresponding to the entry selected in step SP40 on the command issuing pattern management table 35 with respect to the external storage device 6 selected as the test object at this point of time (SP45).

Thereafter, the channel processor 21 determines whether or not the I/O performance tests are finished with respect to all command kinds (SP46) and, when the channel processor 21 obtains a negative result, the channel processor 21 returns to the step SP41. Then, the channel processor 21, thereafter, repeats the processing from step SP 41 to step SP46 while sequentially changing over the command kind selected in step SP41 to other command kind.

Further, when the channel processor 21 obtains an affirmative result in step SP 46 by finishing of the I/O performance tests with all command kinds in the command issuing pattern corresponding to the entry in the command issuing pattern management table 35 selected in step SP40 later, the channel processor 21 determines whether or not the similar processing is finished with respect to all entries of the command issuing pattern management table 35 (with respect to all command issuing patterns) (SP47).

Then, when the channel processor 21 obtains a negative result in this determination, thereafter, the channel processor 21 repeats the processing from step SP40 to step SP47 while sequentially changing over the entry in the command issuing pattern management table 35 selected in step SP40 to other entry.

Further, when the channel processor 21 obtains an affirmative result in step SP 47 by finishing of the similar processing with respect to all entries of the command issuing pattern management table 35 (with respect to all command issuing patterns), the channel processor 21 determines whether or not a check is filled in the check box 52 which corresponds to an item: "A pattern having the maximum performance is automatically set to a default setting" on the measurement environment setting screen 50 explained previously in conjunction with FIG. 9 (SP48).

When the channel processor 21 obtains a negative result in this determination, the channel processor 21 finishes the I/O performance test performing processing, while when the channel processor 21 obtains an affirmative result in this determination, the channel processor 21 respectively sets command issuing patterns having a maximum I/O performance as default in the operation-time command issuing pattern management table 37 (FIG. 4) in step SP40 to step SP47 for every command kind (sequential read, sequential write, random read and random write) (SP49) and, thereafter, finishes the I/O performance test performing processing explained previously in conjunction with FIG. 14.

(4-4) I/O Performance Test Processing

Figure 15:
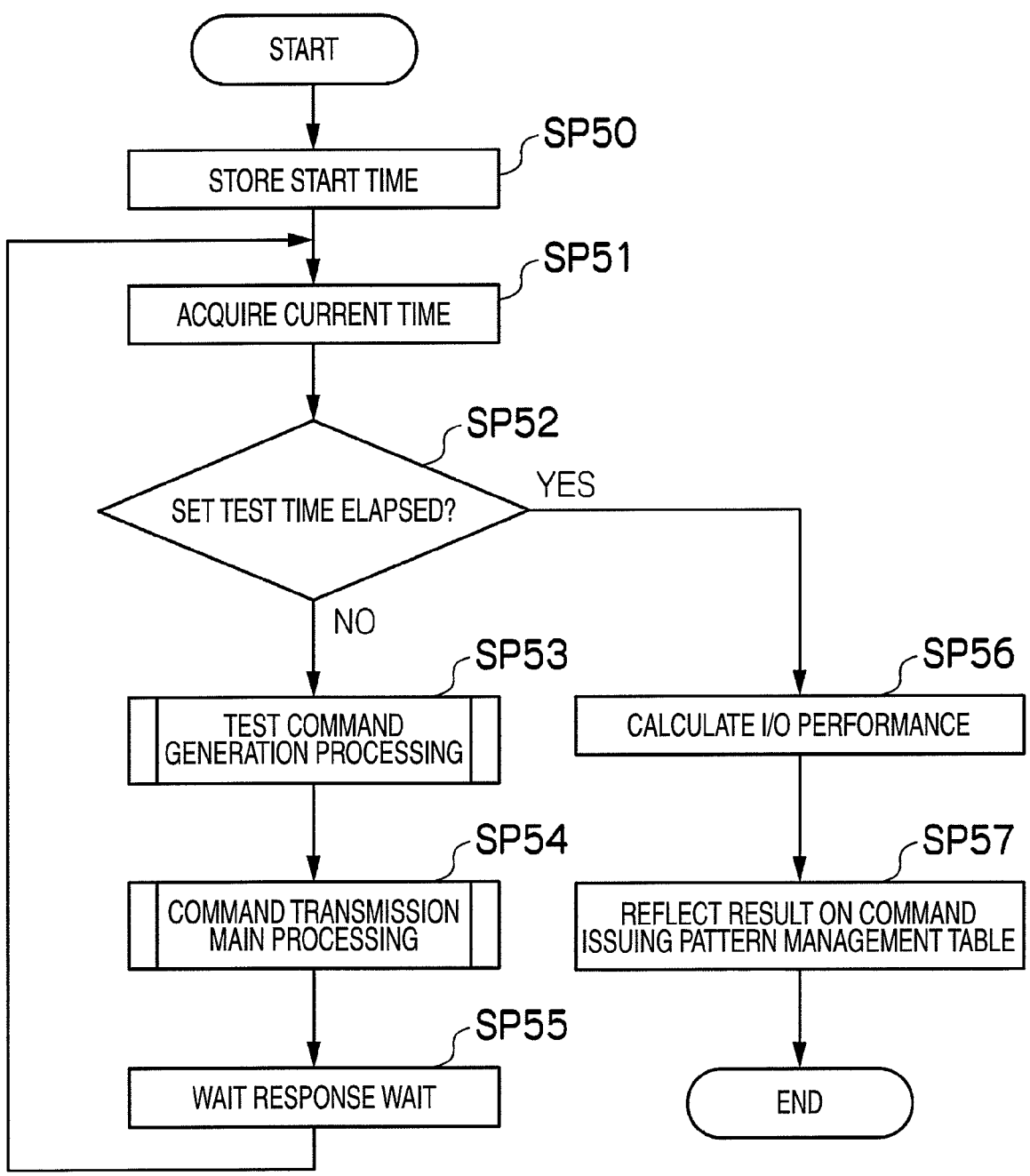
FIG. 15 is a flowchart showing steps of I/O performance test processing.

FIG. 15 shows a specific processing content of the channel processor 21 in step SP45 of I/O performance test performing processing explained previously in conjunction with FIG. 14.

When the channel processor 21 advances to step SP45 for the I/O performance test performing processing, the channel processor 21 starts the I/O performance test processing shown in FIG. 15, and, first of all, stores a current time as a start time of the I/O performance test (SP 50).

Subsequently, the channel processor 21 acquires a current time (SP51). Thereafter, based on the start time stored in step SP50 and the current time acquired in step SP51, the channel processor 21 determines whether or not a test time defined on the I/O performance test environment setting management table 36 (FIG. 3) with respect to the command kind with which the I/O performance test is currently executed elapses (SP52).

Then, when the channel processor 21 obtains a negative result in this determination, the channel processor 21 generates a test command for a command issuing pattern which currently constitutes the object (SP53) and transmits the generated test command to the external storage device 6 which currently constitutes the object (SP54) and, thereafter, waits for response from the external storage device 6 in response to the test command (SP55).

Subsequently, the channel processor 21 returns to step SP51 and, thereafter, repeats the processing in step SP51 to step 55 from the point of time that the channel processor 21 starts the I/O performance test with respect to the command kind which is currently executed and to a point of time that the test time defined on the I/O performance test environment setting management table 36 (FIG. 3) elapses.

Thereafter, when the channel processor 21 obtains an affirmative result in step SP52 later, based on a response result from the external storage device 6 in response to the test command transmitted to the external storage device 6 in the above-mentioned manner, calculates a reading or writing amount of data per one second in the external storage device 6 (when the command kind is sequential read or sequential write), or the number of commands processed per one second (when the command kind is random read or random write) (SP56). The calculated result is reflected on the command issuing pattern management table (SP57) and, thereafter, the channel processor 21 finishes the I/O performance test processing.

(4-5) Test Command Generation Processing

Figure 16:
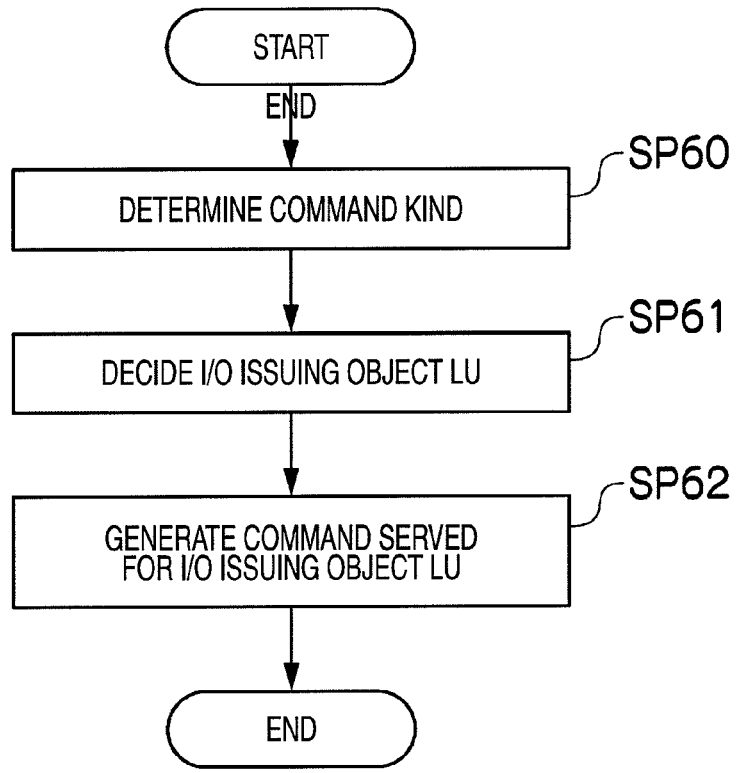
FIG. 16 is a flowchart showing steps of test command generation processing.

FIG. 16 shows a specific processing content of the channel processor 21 in step SP53 of the I/O performance test processing explained previously in conjunction with FIG. 15.

When the channel processor 21 advances to step SP53 of the I/O performance test processing, the channel processor 21 starts the test command generation processing shown in FIG. 16. The channel processor 21, first of all, determines the command kind of the command to be issued (SP60). The command kind which is determined at this point of time is the command kind selected in step SP41 of the I/O performance test performing processing explained previously in conjunction with FIG. 14.

Subsequently, the channel processor 21 determines the logical volumes in the external storage device 6 to which the command is issued. To be more specific, the channel processor 21 selects the logical volumes the number of which is the number stored in the corresponding external storage issuing LU number column 36D (FIG. 3) on the I/O performance test environment setting management table 36 among the logical volumes which are respectively made to correspond to the ports having respective port IDs stored in the use port column 36F (FIG. 3) on the I/O performance test environment setting management table 36 (FIG. 3) (SP61).

Subsequently, the channel processor 21 generates a command which is issued for the respective logical volumes selected at this point of time (command of the command kind which constitutes the object at this point of time) and stores the generated command in the cache memory 22 (FIG. 1) (SP62). Then, the channel processor 21, thereafter, finishes the test command generation processing and returns to the I/O performance test processing.

(4-6) Command Transmission Main Processing

Figure 17:
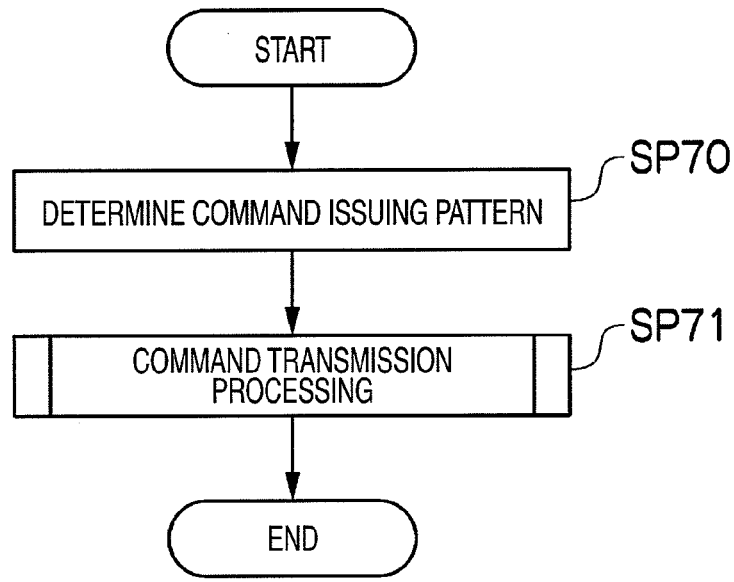
FIG. 17 is a flowchart showing steps of command transmission main processing.

On the other hand, FIG. 17 shows the specific processing content of the channel processor 21 in step SP54 of the I/O performance test processing explained previously in conjunction with FIG. 15.

When the channel processor 21 advances to step SP54 of the I/O performance test processing, the channel processor 21 starts the command transmission main processing shown in FIG. 17. First of all, the channel processor 21 determines the command issuing pattern of the command to be transmitted to the external storage device 6 which constitutes the object (SP70). The command issuing pattern determined at this point of time is the command issuing pattern of the command kind selected in step SP41 of the I/O performance test performing processing explained previously in conjunction with FIG. 14, and is the command issuing pattern on which an I/O performance test is not performed yet.

Subsequently, the channel processor 21 transmits the command generated in the command generation processing explained previously in conjunction with FIG. 16 to the external storage device 6 which constitutes the test object in the command issuing pattern decided in step SP70 (SP71). Thereafter, the channel processor 21 finishes the command transmission main processing and returns to the I/O performance test processing.

(4-7) Command Transmission Processing

FIG. 18 to FIG. 21 show a specific processing content of the command transmission processing executed in step SP71 of the command transmission main processing explained previously in conjunction with FIG. 17. When the command issuing method served for the test at the point of time is the first command issuing method, the channel processor 21 transmits the command to the external storage device 6 in accordance with the first command transmission processing shown in FIG. 18, while when the command issuing method served for the test at the point of time is the second command issuing method, the channel processor 21 transmits the command to the external storage device 6 in accordance with the second command transmission processing shown in FIG. 19.

Figure 20:
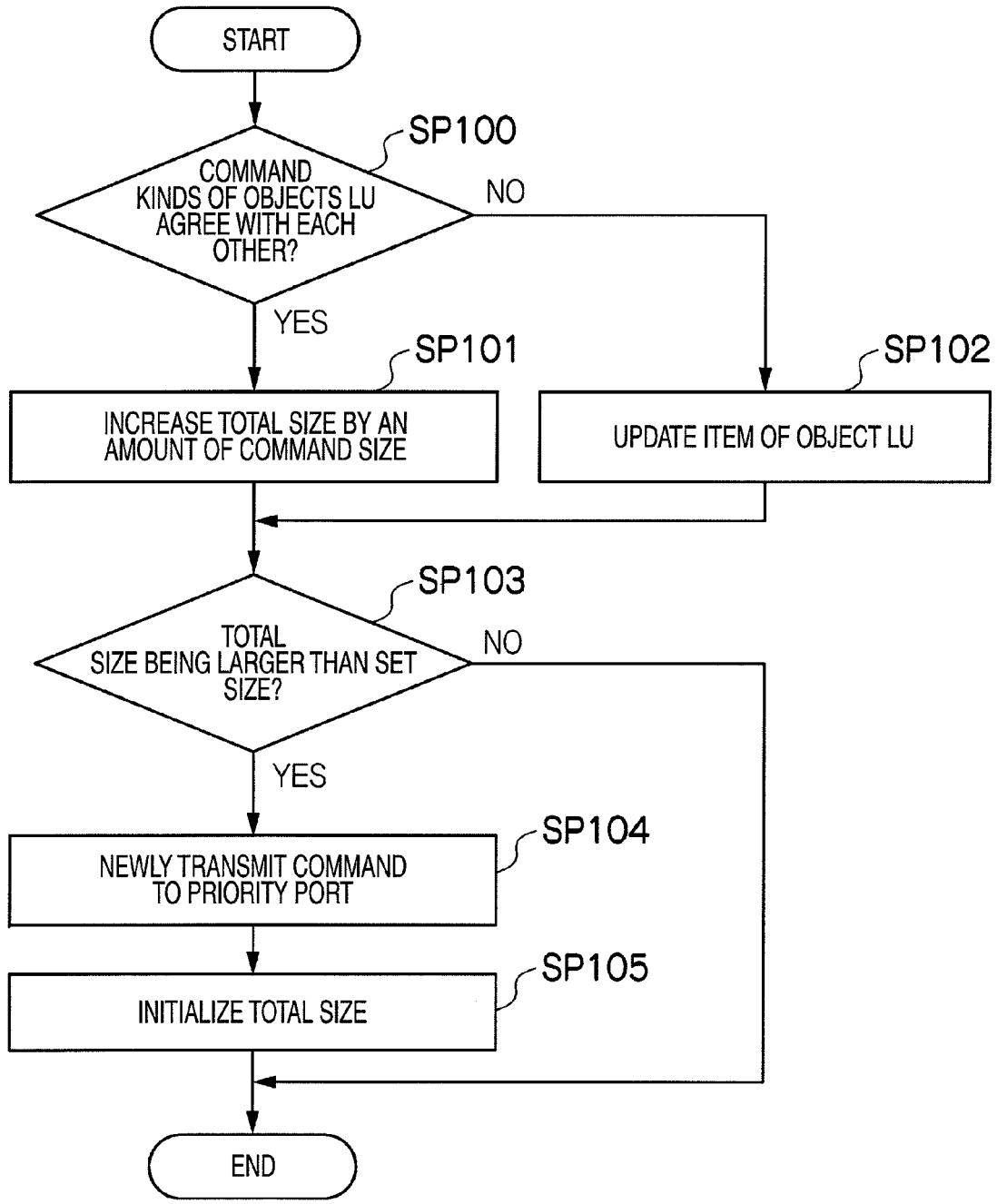
FIG. 20 is a flowchart showing steps of third command transmission processing.
Figure 21:
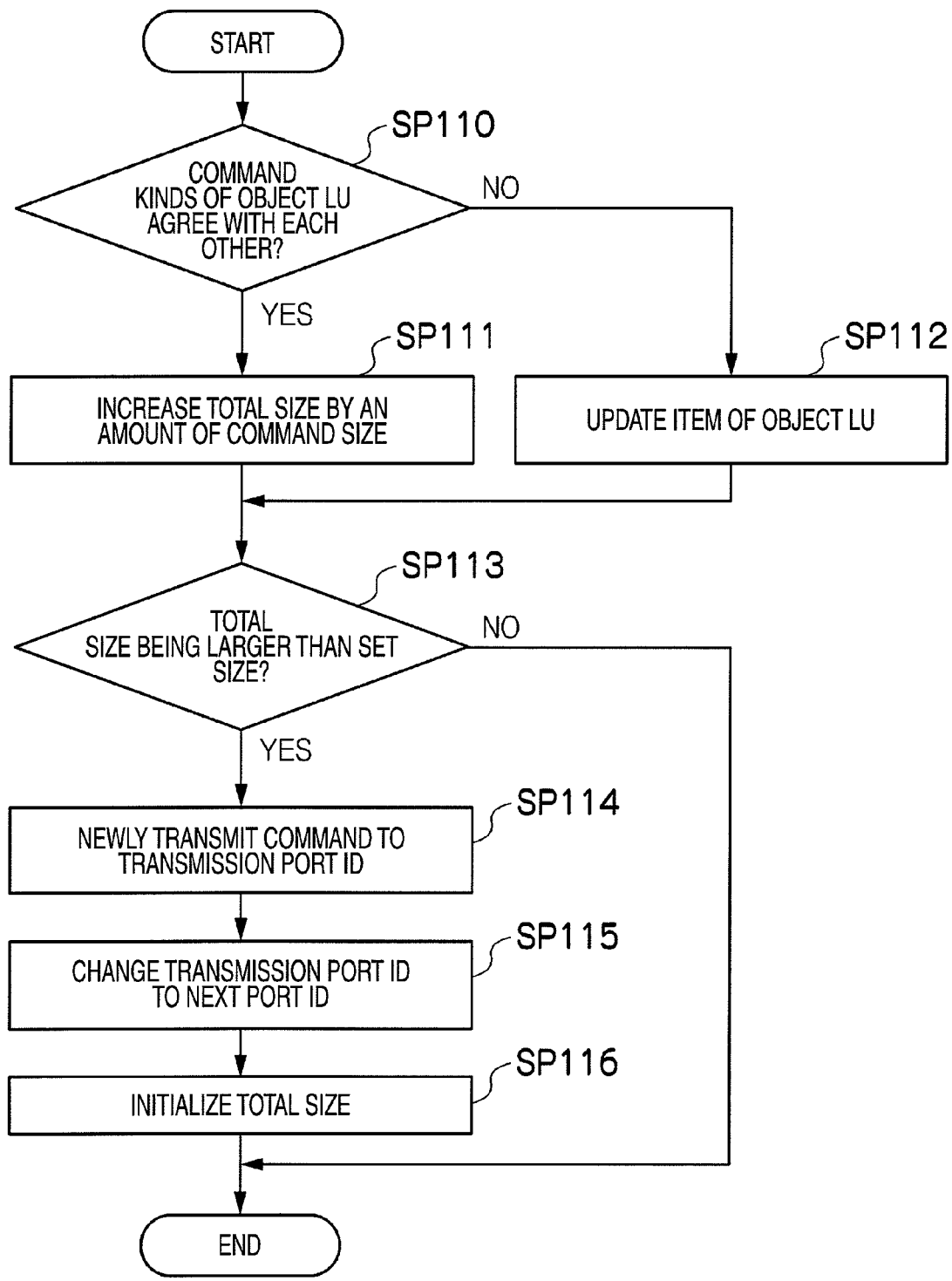
FIG. 21 is a flowchart showing steps of a fourth command transmission processing.

Further, when the command issuing method served for the test at the point of time is the third command issuing method, the channel processor 21 transmits the command to the external storage device 6 in accordance with the third command transmission processing shown in FIG. 20, while when the command issuing method served for the test at the point of time is the fourth command issuing method, the channel processor 21 transmits the command to the external storage device 6 in accordance with the fourth command transmission processing shown in FIG. 21.

(4-7-1) Command Transmission Processing by First Command Issuing Method

Figure 18:
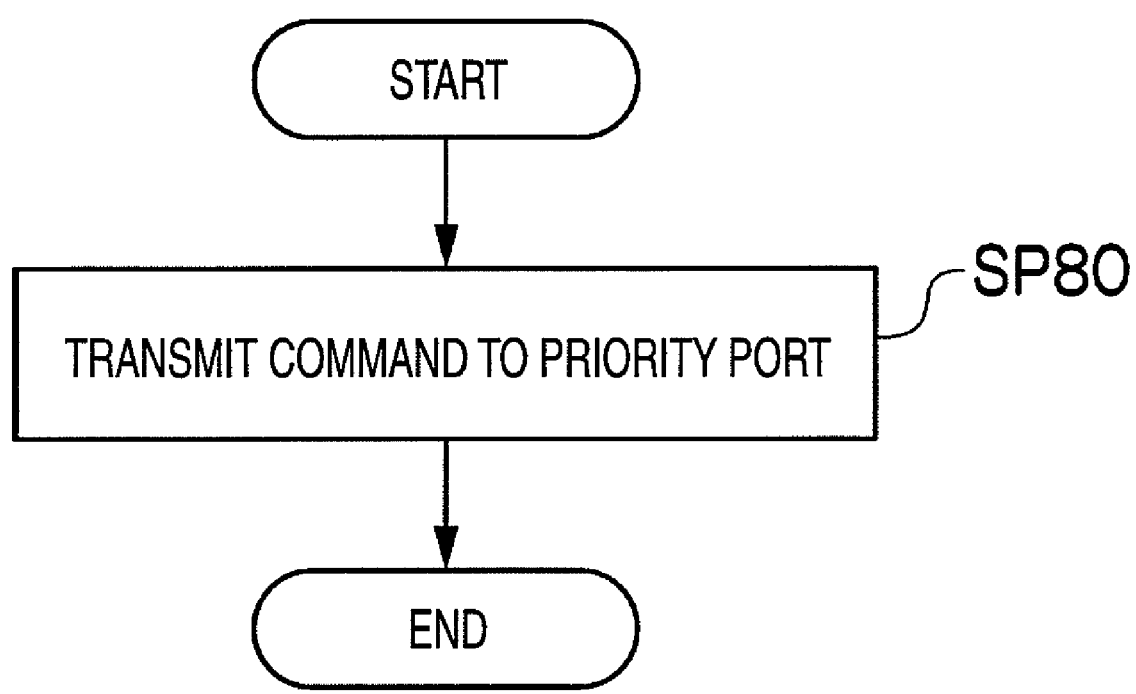
FIG. 18 is a flowchart showing steps of first command transmission processing.

FIG. 18 shows specific processing content of the channel processor 21 when the command issuing method served for the test at the point of time is the first command issuing method.

In this case, in accordance with the first command transmission processing steps shown in FIG. 18, the channel processor 21 transmits the command generated by the test command generation processing explained previously in conjunction with FIG. 16 to the respective corresponding logical volumes in the external storage device 6 (logical volumes selected in step SP61 in FIG. 16) via the respective priority ports 20 set with respect to the logical volumes. Thereafter, the channel processor 21 finishes the first command transmission processing and returns to the command transmission main processing.

(4-7-2) Command Transmission Processing by Second Command Issuing Method

Figure 19:
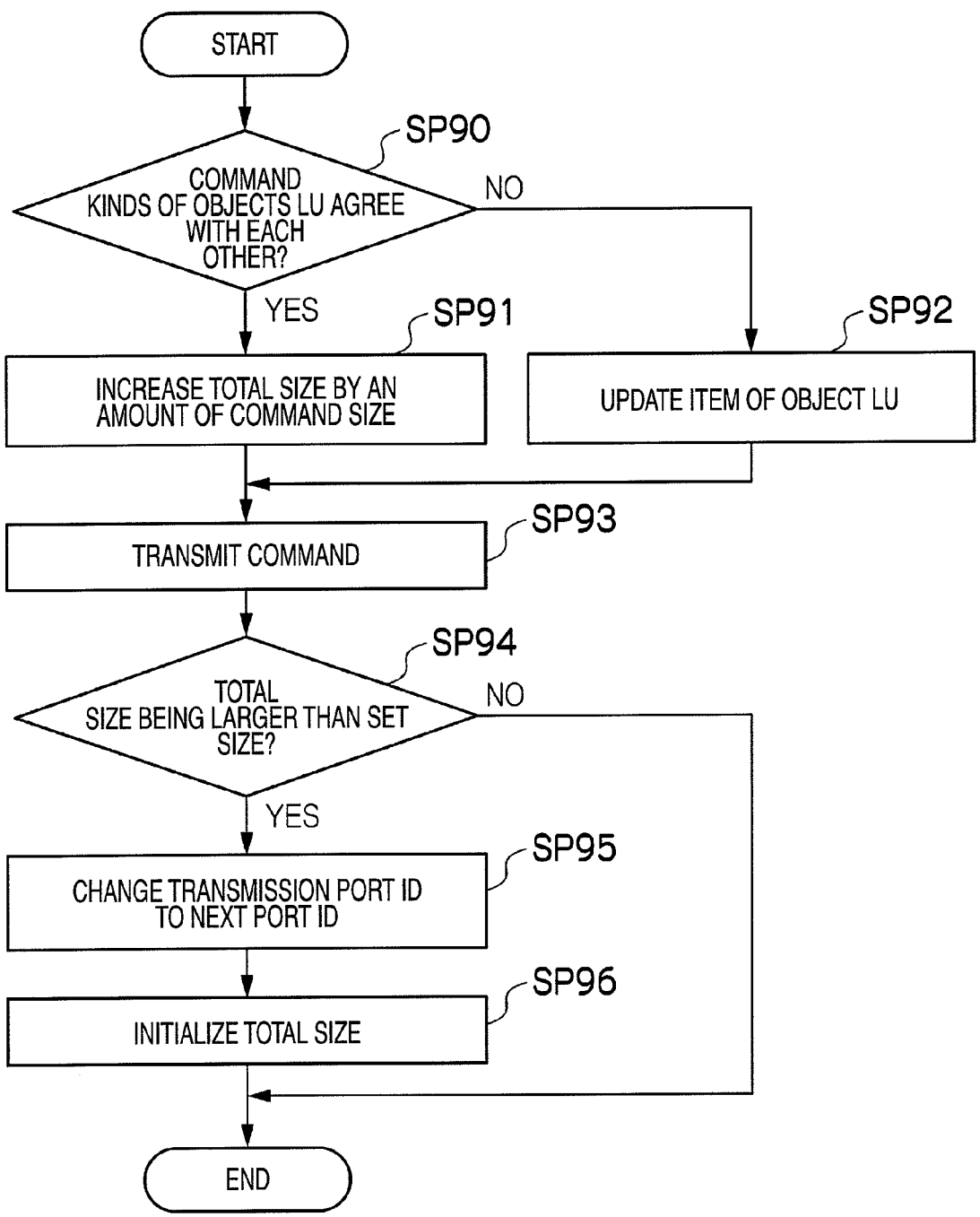
FIG. 19 is a flowchart showing steps of second command transmission processing.

On the other hand, FIG. 19 shows the specific processing content of the channel processor 21 when the command issuing method served for the test at the point of time is the second command issuing method.

In this case, the channel processor 21, first of all, by looking up the command issuing order management table 38 (FIG. 5) determines whether or not the command kind of the command transmitted to the logical volume which constitutes the object at this point of time among the logical volumes in the external storage device 6 served for the test object agrees with the command kind of the command which has been continuously transmitted until the point of time (SP90).

When the channel processor 21 obtains an affirmative result in this determination, the channel processor 21 increases the total size stored in the total size column 38F (FIG. 5) of the corresponding entry in the command issuing order management table 38 by a size of data read or written by the command transmitted this time (SP91).

On the other hand, when the channel processor 21 obtains a negative result in determination in step SP90, the channel processor 21 initializes the command issuing order management table 38 and stores the corresponding information in the LUN column 38B (FIG. 5), the command kind column 38C (FIG. 5) and the start time column 38G (FIG. 5) of the corresponding entry. Further, the channel processor 21 stores an amount of data read or written by the command transmitted this time in the total size column 38F of the entry (SP92).

Subsequently, the channel processor 21 transmits the corresponding commands to the external storage device 6 via the port 20 set in the command issuing order management table 38 in accordance with the second command issuing method (SP93) and, thereafter, determines whether or not the total size stored in the total size column 38F of the corresponding entries in the command issuing order management table 38 exceeds a size stored in the command size column 35D (FIG. 2) of the corresponding entry in the command issuing pattern management table 35 (FIG. 2) (SP94).

When the channel processor 21 obtains a negative result in this determination, the channel processor 21 finishes the second command transmission processing shown in FIG. 19 and returns to the command transmission main processing.

On the other hand, when the channel processor 21 obtains an affirmative result in this determination, the channel processor 21 changes the port ID stored in the transmission port ID column 38D (FIG. 5) of the corresponding entry in the command issuing order management table 38 (FIG. 5) to the port ID of the next port (SP95).

Subsequently, the channel processor 21 initializes the total size stored in the total size column 38F (FIG. 5) of the entry (total size being reset to "0") (SP96) and, thereafter, finishes the second command transmission processing shown in FIG. 19 and returns to the command transmission main processing.

(4-7-3) Command Transmission Processing by Third Command Issuing Method

On the other hand, FIG. 20 shows a specific processing content of the channel processor 21 when the command issuing method served for the test at the point of time is the third command issuing method.

In this case, the channel processor 21 processes step SP100 to step SP102 in the same manner as the step SP90 to step SP92 of the second command transmission processing explained previously in conjunction with FIG. 19. Thereafter, the channel processor 21 determines whether or not the total size stored in the total size column 38F of the corresponding entry in the command issuing order management table 38 exceeds the threshold value of the command size stored in the command size column 35D (FIG. 2) of the corresponding entry in the command issuing pattern management table 35 (FIG. 2) (SP103).

When the channel processor 21 obtains a negative result in this determination, the channel processor 21 finishes the third command transmission processing and returns to the command transmission main processing.

On the other hand, when the channel processor 21 obtains an affirmative result in the determination in step SP103, the channel processor 21 transmits a command to perform reading or writing of data whose amount corresponds to the difference between the total size stored in the total size column 38F of the corresponding entry in the command issuing order management table 38 and the threshold value of the command size stored in the command size column 35D (FIG. 2) of the corresponding entry in the command issuing pattern management table 35 (FIG. 2) to the external storage device 6 via the priority port 20 of the logical volume which constitutes the object at this point of time (SP104).

Next, the channel processor 21 initializes the total size stored in the total size column 38F (being reset to "0") (FIG. 5) of the corresponding entry in the command issuing order management table 38 (SP105) and, thereafter, finishes the third command transmission processing and returns to the command transmission main processing.

(4-7-4) Command Transmission Processing by Fourth Command Issuing Method

FIG. 21 shows a specific processing content of the channel processor 21 when the command issuing method served for the test at the point of time is the fourth command issuing method.

In this case, the channel processor 21 processes step SP110 to step SP114 in the same manner as the step SP100 to step SP104 of the third command transmission processing explained previously in conjunction with FIG. 20. Thereafter, the channel processor 21 changes the port ID stored in the transmission port ID column 38D of the corresponding entry on the command issuing order management table 38 to the port ID of the next port 20 (SP115).

Next, the channel processor 21 initializes the total size stored in the total size column 38F (being reset to "0") (FIG. 5) of the corresponding entry in the command issuing order management table 38 (SP116) and, thereafter, finishes the fourth command transmission processing and returns to the command transmission main processing.

Figure 22:
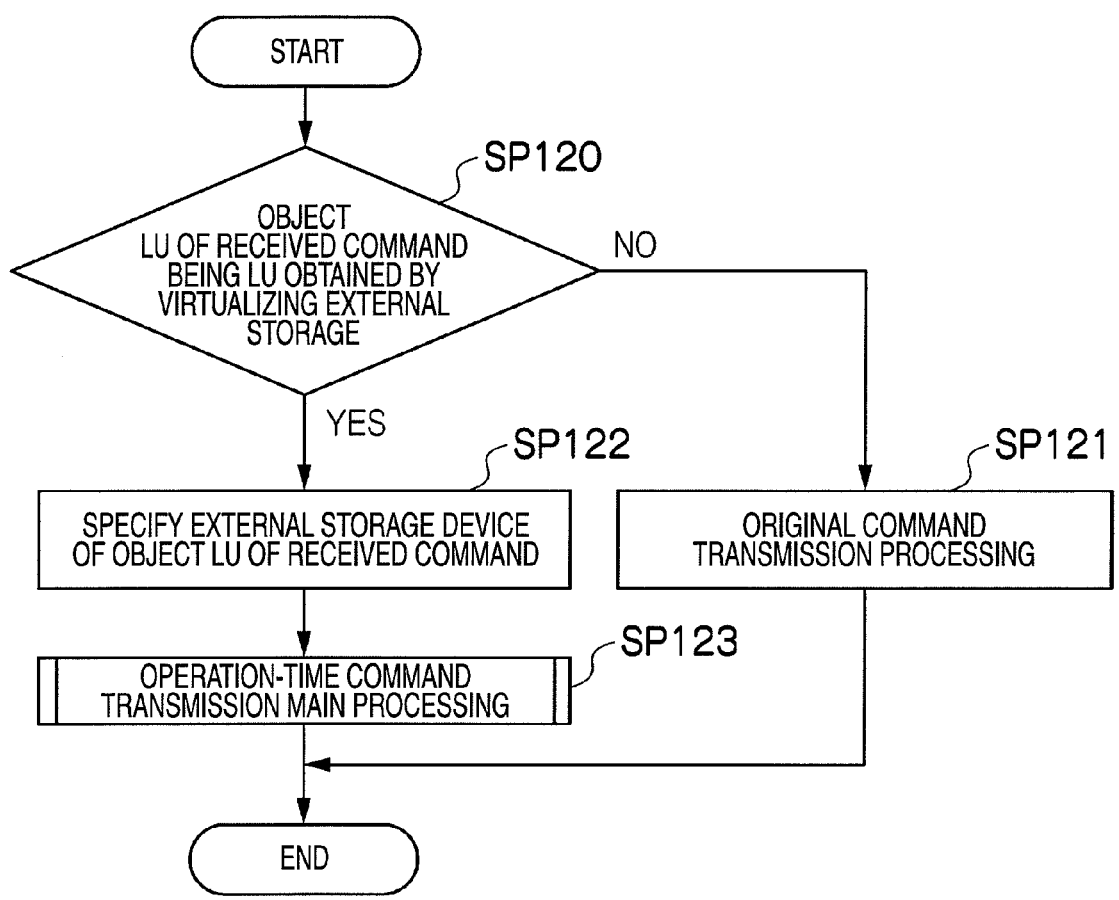
FIG. 22 is a flowchart showing steps of operation-time command processing.

(4-8) Command Processing of Channel Processor in Operation (4-8-1) Command Processing in Operation FIG. 22 shows a specific processing content of the channel processor 21 of the main storage device 4 which receives a command (sequential read command, sequential write command, random read command or random write command) transmitted from the host computer 2 (FIG. 1) in operation. The channel processor 21 executes the operation-time command processing shown in FIG. 22 based on the operation-time command processing program 31 (FIG. 1) stored in the internal memory 21B (FIG. 1).

That is, when the channel processor 21 receives the command from the host computer 2, the channel processor 21 starts the operation-time command processing and, first of all, determines whether or not the logical volume which is the read or write destination of data designated in the received command is a virtual volume which is made to correspond to the logical volume provided by the external storage device 6 (SP120).

When a negative result is obtained in this determination, this implies that the logical volume which is the read or write destination of data designated in the received command is a logical volume having substance which is provided by the main storage device 4.

In this manner, at this point of time, the channel processor 21 reads or writes the data designated by the command from or in the logical volume designated by the command (SP121) and, thereafter, finishes the operation-time command processing.

On the other hand, when an affirmative result is obtained in the determination in step SP120, this implies that the logical volume which is the final read or write destination of data designated by the received command is the virtual volume provided by the external storage device 6.

In this manner, at this point of time, the channel processor 21, by looking up a table not shown in the drawing for managing the corresponding relationship between the virtual volume and the logical volume in the external storage device 6, specifies the external storage device 6 in which the logical volume corresponding to the virtual volume is present (SP122).

Next, the channel processor 21 transmits the command to the external storage device 6 for instructing the external storage device 6 to read or write the designated data (SP123) and, thereafter, finishes the operation-time command processing.

(4-8-2) Operation-Time Command Transmission Main Processing

Figure 23:
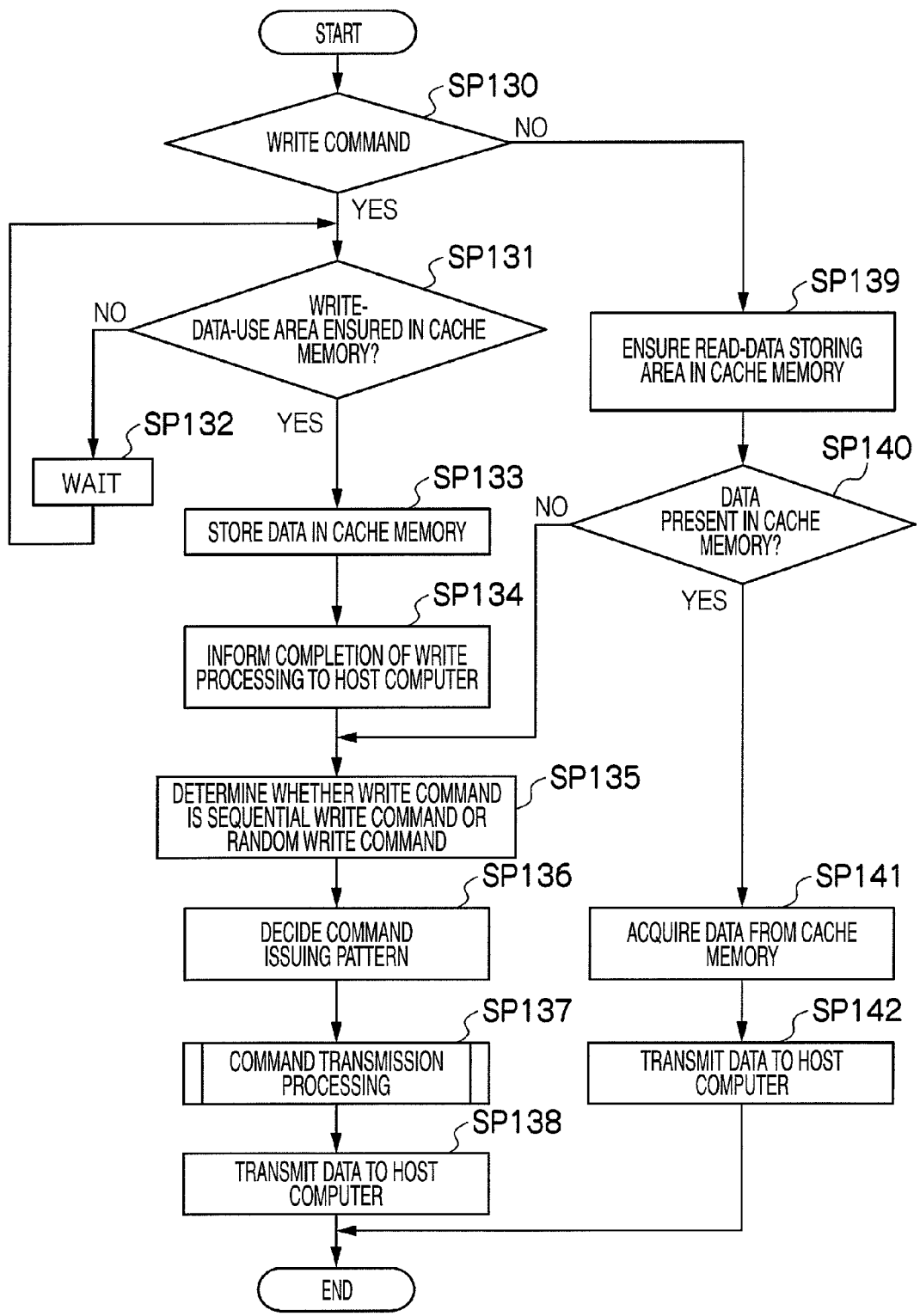
FIG. 23 is a flowchart showing steps of operation-time command transmission main processing.

FIG. 23 shows a specific processing content of the channel processor 21 in step SP123 of the operation-time command processing explained previously in conjunction with FIG. 22.

When the channel processor 21 advances to step SP123 of the operation-time command processing, the channel processor 21 starts the operation-time command transmission main processing shown in FIG. 23. First of all, the channel processor 21 determines whether or not the command received at the point of time is a write command (SP130).

When the channel processor 21 obtains an affirmative result in this determination, the channel processor 21 determines whether or not it is possible to ensure an area for temporarily storing the write data in the cache memory 22 (FIG. 1) in the main storage device 4 (SP131).

When the channel processor 21 obtains a negative result in this determination, the channel processor 21 waits for a predetermined time (SP132) and, thereafter, returns to step SP131. Then, the channel processor 21 repeats the processing of step SP131 and step SP132 until an affirmative result is obtained in step SP131.

When the channel processor 21 obtains the affirmative result in step SP131 later, the channel processor 21 stores the write data transmitted from the host computer 2 together with the write command in the cache memory 22 in the main storage device 4 (SP133) and, thereafter, informs the host computer 2 of the completion of the write processing (SP134).

Subsequently, the channel processor 21, based on the commands received heretofore, determines that the write command is either a sequential write command or a random write command (SP135).

Then, the channel processor 21, based on a result of such determination, determines the command issuing pattern of the write command to be transmitted to the corresponding external storage device based on the write command (SP136). To be more specific, the channel processor 21 determines the command issuing pattern by looking up the determination result in step SP135, the operation-time command issuing pattern management table 37, the current time and the like.

Then, the channel processor 21, thereafter, transmits the write command to the corresponding external storage device in accordance with the command issuing pattern determined in step SP136 (SP137). Here, as the command transmission method at this point of time, the corresponding method out of the methods explained previously in conjunction with FIG. 18 to FIG. 21 is used. Then, the channel processor 21, thereafter, finishes the operation-time command transmission main processing.

On the other hand, when the channel processor 21 obtains a negative result in the determination in step SP130, ensures an area for storing the read data in the cache memory 22 (FIG. 1) in the main storage device 4 (SP139) and, thereafter, determines whether or not the data which constitutes the object to be read is present in the cache memory 22 (SP140).

When the channel processor 21 obtains a negative result in this determination, the channel processor 21 advances to step SP135 and, thereafter, transmits the command to the corresponding external storage device 6 by sequentially executing the processing explained previously in conjunction with step SP135 to step SP137. Accordingly, the channel processor 21 allows the external storage device 6 to read the data which constitutes the object to be read designated by the read command transmitted from the host computer 2.

Then, when the data which constitutes the object to be read is transferred from the external storage device 6, the channel processor 21 transfers the data to the host computer 2 (SP138) and, thereafter, finishes the operation-time command transmission main processing.

On the other hand, when the channel processor 21 obtains an affirmative result in the determination in step SP139, the channel processor 21 reads the data which constitutes the object to be read from the cache memory 22 (SP141) and transmits the data which is read to the host computer 2 (SP142). Then, the channel processor 21, thereafter, finishes the operation-time command transmission main processing.

(4-8-3) Command Response Processing

Figure 24:
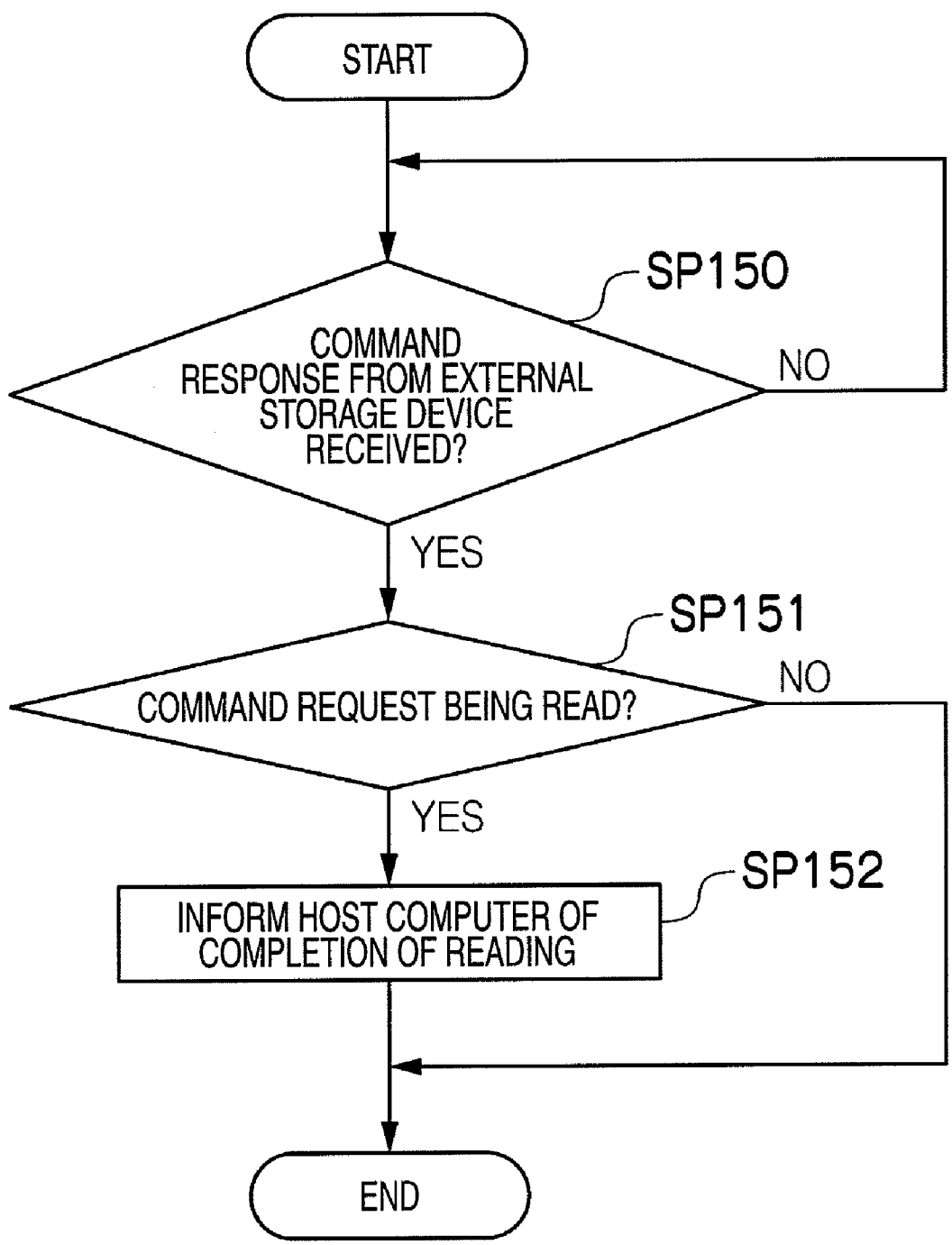
FIG. 24 is a flowchart showing steps of command response processing.

On the other hand, FIG. 24 shows steps of the command response processing executed by the channel processor 21 in parallel with the operation-time command processing explained previously in conjunction with FIG. 22.

When the channel processor 21 receives the command transmitted from the host computer 2 (FIG. 1) at the time of operation, the channel processor 21 executes the command response processing based on the command response program 33 (FIG. 1) stored in the internal memory 21B (FIG. 1).

That is, when the channel processor 21 receives the command from the host computer 2 at the time of operation, the channel processor 21 starts the command response processing and transmits the command to the corresponding external storage device 6 in step SP136 shown in FIG. 23 and, thereafter, waits for reception of response to the command transmitted from the external storage device 6 (SP150).

Then, when the channel processor 21 receives the response, the channel processor 21 determines whether or not the command request given from the host computer 2 is a read request (SP151). Then, when the channel processor 21 obtains a negative result in this determination, the channel processor 21 finishes the command response processing.

On the other hand, when the channel processor 21 obtains an affirmative result in the determination in step SP151, the channel processor 21 transmits read completion information to the host computer 2 which transmits the read request (SP152) and, thereafter, finishes the command response processing.

(4-8-4) Periodic Processing

In the third command issuing method and the fourth command issuing method, as described above, the commands are stored by a size set in the command issuing pattern management table 35 (FIG. 2) and, thereafter, the commands are transmitted to the external storage device 6 at a time.

According, for example, in step SP136 of the operation-time command transmission main processing explained previously in conjunction with FIG. 23, when the third command issuing pattern or the fourth command issuing pattern is determined as the command issuing pattern, there arises a drawback that, when the command from the host computer 2 does not reach frequently, the command waiting state continues for a long time and hence, the performance of the main storage device 4 in view of the host computer 2 is lowered.

Accordingly, in the main storage device 4 of this embodiment, when the third command issuing pattern or the fourth command issuing pattern is determined as the command issuing pattern, the command issuing order management table is periodically searched and, when there exists a case in which the main storage device 4 is left for a long time from the start time, even when the commands by a size set in the command issuing pattern management table 35 are not stored, the commands stored heretofore are transmitted to the external storage device 6.

Figure 25:
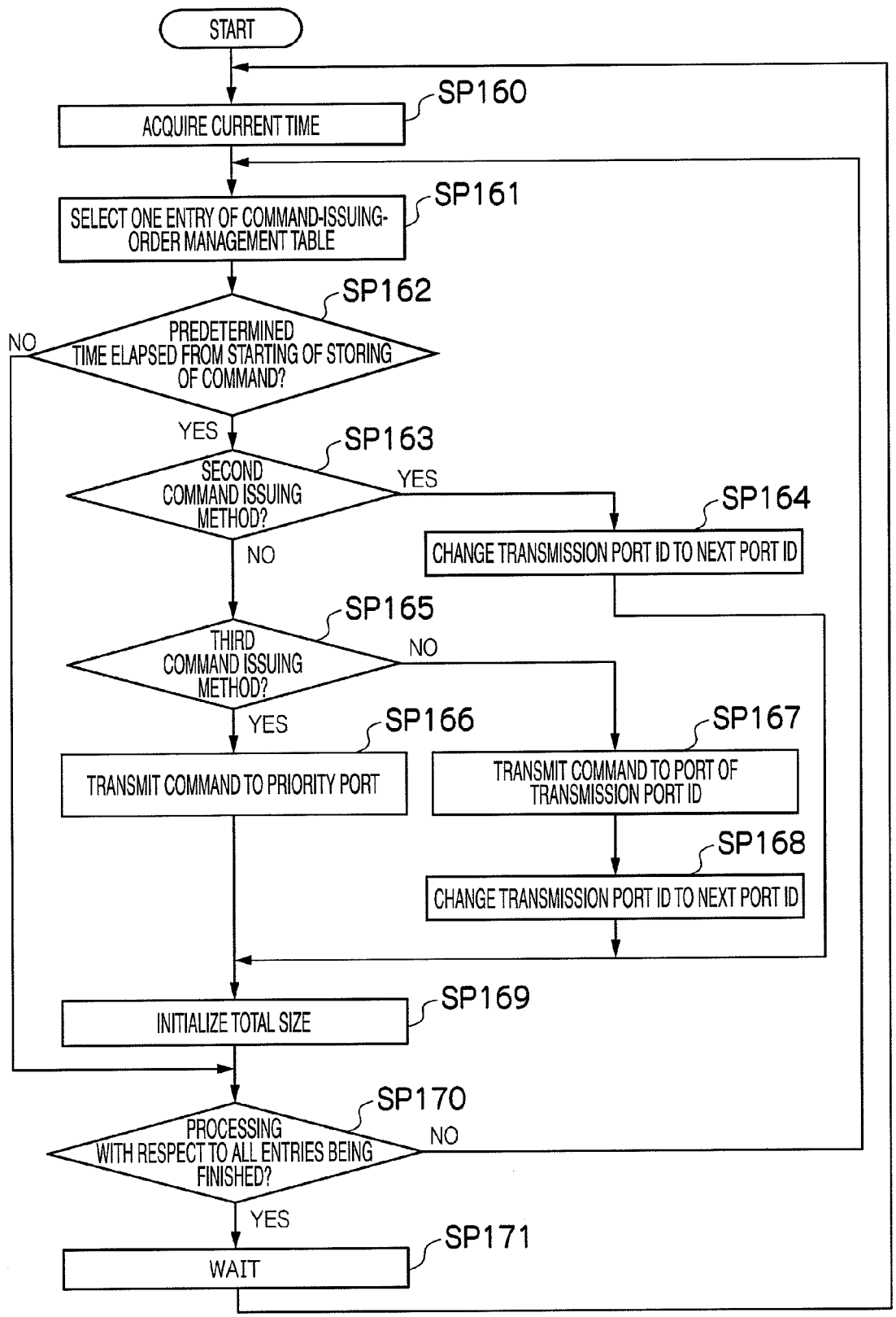
FIG. 25 is a flowchart showing steps of periodic processing.

FIG. 25 shows a specific processing content of the channel processor 21 relating to such control processing. The channel processor 21 executes the periodic processing shown in FIG. 25 based on the periodic processing program 34 stored in the internal memory 21B (FIG. 1).

That is, when the electricity is supplied to the main storage device 4, the channel processor 21 starts the periodic processing shown in FIG. 25 and, first of all, acquires the current time (SP160).

Subsequently, the channel processor 21 selects one entry (row) of the command issuing order management table 38 (FIG. 5) (SP161) and, thereafter, by looking up the start time column 38G (FIG. 5) of the entry, determines whether or not the predetermined time has elapsed from starting the storing of the commands with respect to the entry (SP162).

When the channel processor 21 obtains a negative result in this determination, the channel processor 21 advances to step SP170, while when the channel processor 21 obtains an affirmative result, the channel processor 21 determines whether or not the command issuing method of the entry is the second command issuing method (SP163).

When the channel processor 21 obtains an affirmative result in this determination, the channel processor 21 changes the transmission port ID stored in the transmission port ID column 38D (FIG. 5) of the entry in the command issuing order management table 38 to the port ID of the next port 20 (SP164) and, thereafter, the channel processor 21 advances to step SP169.

On the other hand, when the channel processor 21 obtains a negative result in the determination in step SP163, the channel processor 21 determines whether or not the command issuing method of the entry is the third command issuing method (SP165).

Then, when the channel processor 21 obtains an affirmative result in this determination, the channel processor 21 generates a new command and transmits the command to the corresponding priority port 20 (SP166) and, thereafter, the channel processor 21 advances to step SP169.

On the other hand, when the channel processor 21 obtains a negative result in the determination in SP165, the channel processor 21 generates a new command and transmits the command to the port 20 of the transmission port ID stored in the transmission port ID column 38D (FIG. 5) of the entry of the command issuing order management table 38 (SP167). Thereafter, the channel processor 21 changes the transmission port ID stored in the transmission port ID column 38D to the port ID of the next port 20 (SP168).

Subsequently, the channel processor 21 initializes the total size stored in the total size column 38F of the entry in the command issuing order management table 38 (total size being reset to "0") (SP169).

Next, the channel processor 21 determines whether or not the similar processing is finished with respect to all entries in the command issuing order management table 38 (SP170). Then, when the channel processor 21 obtains a negative result in this determination, the channel processor 21 returns to step SP161 and, thereafter, repeats the similar processing until the channel processor 21 obtains an affirmative result in step SP170.

Then, when the channel processor 21 obtains an affirmative result in step SP170 by finishing the similar processing with respect to all entries in the command issuing order management table 38, the channel processor 21 waits for a lapse of a predetermined time which is preliminarily set as a period for executing the processing of step SP 160 to step SP170 (SP171).

Then, when the predetermined time elapses, the channel processor 21 returns to step SP160 and, thereafter, repeats the similar processing.

(4-8-5) Volume Priority Port Setting Processing

Figure 26:
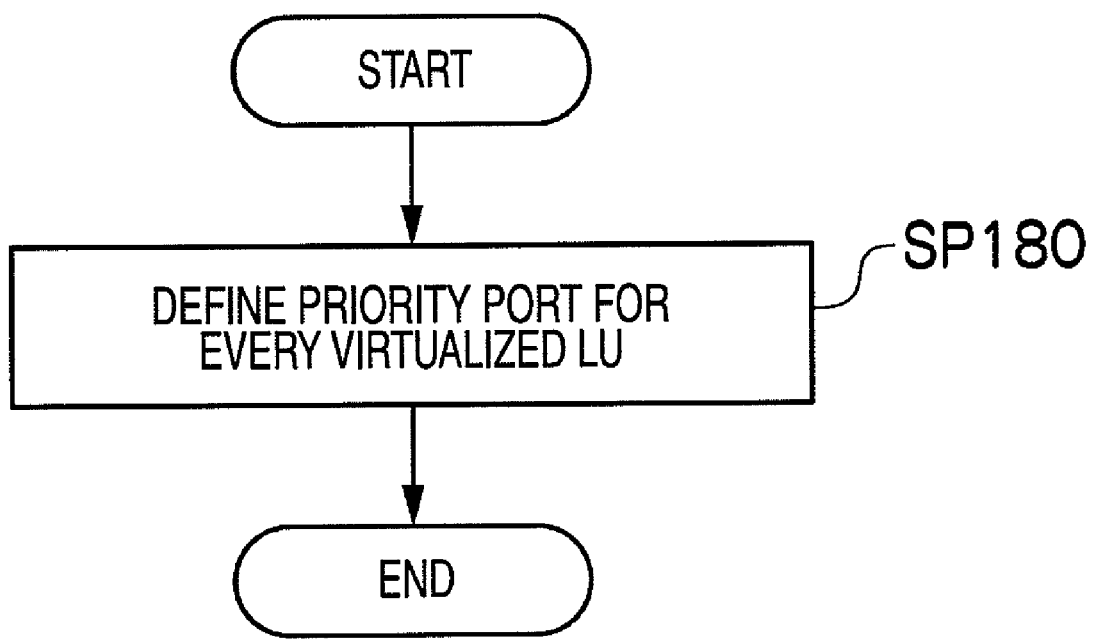
FIG. 26 is a flowchart showing steps of volume-priority-port setting processing.

FIG. 26 shows the processing content of the channel processor 21 in the operation of the stage system 1 relating to setting of the priority port 20 when the command issuing pattern of the first or third command issuing method is selected or set as a command issuing pattern of sequential read, sequential write, random read and/or random write. The channel processor 21 executes the volume priority port setting processing shown in FIG. 26 in accordance with the volume priority port set program 32 (FIG. 1) stored in the internal memory 21B (FIG. 1).

That is, when the command issuing pattern of the first command or third command issuing method is selected or set as the command issuing pattern of sequential read, sequential write, random read and/or random write with respect to a certain external storage device 6, the channel processor 21, first of all, by looking up the volume priority port management table 39 (FIG. 6), sets a priority port 20 for every virtualized logical volume (SP180). Thereafter, the channel processor 21 finishes the volume priority port setting processing shown in FIG. 26.

(5) Advantageous Effects of this Embodiment

As has been explained heretofore, in the storage system 1 according to this embodiment, the channel processor 21 issues the test command to the external storage device 6 using the plurality of command issuing patterns for every command kind and, at the same time, measures I/O performance for every command issuing pattern, and displays a measurement result of the I/O performance for every command issuing pattern or sets the optimum command issuing pattern as the command issuing pattern when the command is issued to the external storage device 6 based on the measurement result of the I/O performance for every command issuing pattern. Due to such constitution, it is unnecessary for the user to completely grasp functions imparted to the external storage device 6 and the properties of the external storage device 6 when the storage system 1 is constructed. Accordingly, in cases such as the construction of the storage system 1 or the introduction of the new external storage device 6, the user can easily set the optimum command issuing pattern for every external storage device 6 with respect to the main storage device 4. In this manner, it is possible to enhance the general-use property and availability of the storage system 1 while enhancing the I/O performance of the storage system 1 as a whole.

(6) Another Embodiment

In the above-mentioned embodiment, the explanation has been made with respect to the case in which the present invention is applied to the storage system 1 having the constitution shown in FIG. 1. However, the present invention is not limited to such constitution, and the present invention is broadly applicable to storage systems having various constitutions in addition to the above-mentioned constitution.

Further, in the above-mentioned embodiment, the explanation has been made with respect to the case in which the first command issuing method to the fourth command issuing method are adopted as the command issuing methods. However, the present invention is not limited to such command issuing methods, and the present invention can bro adopt various other command issuing methods in addition to command issuing methods.

Further, in the above-mentioned embodiment, the explanation has been made with respect to the case in which the threshold values of the command size (the first threshold value and the second threshold value) are set to "0" MB, "10000000" MB, "20000000" MB and "50000000" MB. However, the present invention is not limited to such a size and various sizes can be widely adopted in addition to such a size.

What is claimed is:

1. A storage device which virtualizes one or a plurality of logical volumes which an external storage device connected to the storage device offers respectively and offers virtualized logical volumes to a host computer, wherein the storage device includes:

a plurality of ports which are connected to the external storage device via respectively different paths; and a channel processor which generates a command corresponding to a read request or a write request given from the host computer, and issues the generated command to the external storage device, and the channel processor is configured, for every kind of the command, to issue a test command corresponding to the generated commands to the external storage device by using each of a plurality of command issuing methods and to measure an I/O performance to process the test command by using each of said plurality of command issuing methods, and to set a command issuing method selected from said plurality of command issuing methods to issue the generated command to the external storage device in an operation time based on the result of measurement of the I/O performance processing the test command using each of the command issuing method.

2. A storage device according to claim 1, wherein the channel processor is configured to issue the test command to the external storage device in the plurality of issuing methods and in one or a plurality of issuing patterns for every issuing method and to measure the I/O performance for every issuing pattern, and to display the result of measurement of the I/O performance for every issuing pattern and/or to set the issuing pattern in issuing the command to the external storage device based on the result of measurement of the I/O performance for every issuing pattern.

3. A storage device according to claim 2, wherein the plurality of issuing patterns in the same issuing method respectively differs from each other in a total amount of data to be read or written in every 1 second.

4. A storage device according to claim 1, wherein the command is one selected from at least a group consisting of a sequential read command which requires reading of sequential data, a sequential write command which requires writing of sequential data, a random read command which requires reading of random data, and a random write command which requires writing of random data.

5. A storage device according to claim 1, wherein one issuing method out of the plurality of issuing method is a method in which one priority port is preliminarily assigned for every logical volume that the external storage device offers out of the plurality of ports, and issues the command associated with the logical volume to the external storage device via the priority port corresponding to the command.

6. A storage device according to claim 1, wherein one issuing method out of the plurality of issuing method is a method in which the command is transmitted to the external storage device via one port out of the plurality of ports, and changes over the port from which the command is transmitted to other port out of the plurality of ports when a total amount of data to be read or written based on the command transmitted via the port exceeds a preset first threshold value.

7. A storage device according to claim 1, wherein one issuing method out of the plurality of issuing method is a method in which one priority port is preliminarily assigned for every logical volume that the external storage device offers out of the plurality of ports, and issues the command associated with the logical volume to the external storage device via the priority port corresponding to the command at a time after storing data to be read or written based on the command by an amount that a total amount of data to be read or written exceeds a second threshold value.

8. A storage device according to claim 1, wherein one issuing method out of the plurality of issuing method is a method in which the command is transmitted to the external storage device via one port out of the plurality of ports at a time after data to be read or written based on the command is stored by an amount that a total amount of data to be read or written exceeds the first threshold value.

9. A control method of a storage device, which virtualizes one or a plurality of logical volumes of an external storage device connected to the storage device, and offers said virtualized logical volumes to a host computer, comprising:

generating a command corresponding to a read request or a write request given from the host computer, and issuing the generated command to the external storage device, and the control method comprises for every kind of the command:

a first step in which a test command in a plurality of command issuing methods is issued to the external storage device and I/O performances for each of said plurality of command issuing methods are measured; and a second step in which a channel processor included in said storage device sets a command issuing method among said plurality of command issuing methods for issuing the generated command to the external storage device in an operation time based on the result of measurement of the I/O performance for each of said plurality of command issuing methods.

10. A control method of a storage device according to claim 9, wherein, in the first step, the channel processor is configured to issue the test command to the external storage device in the plurality of issuing methods and in one or a plurality of issuing patterns for every issuing method and to measure the I/O performance for every issuing pattern, and in the second step, the result of measurement of the I/O performance for every issuing pattern is measured and/or the issuing pattern in issuing the command to the external storage device is set based on the result of measurement of the I/O performance for every issuing pattern.

11. A control method of a storage device according to claim 10, wherein the plurality of issuing patterns in the same issuing method respectively differ from each other in a total amount of data to be read or written in every 1 second.

12. A control method of a storage device according to claim 9, wherein the command is one selected from at least a group consisting of a sequential read command which requires reading of sequential data, a sequential write command which requires writing of sequential data, a random read command which requires reading of random data, and a random write command which requires writing of random data.

13. A control method of a storage device according to claim 9, wherein one issuing method out of the plurality of issuing methods is a method in which one priority port is preliminarily assigned for every logical volume that the external storage device offers out of the plurality of ports, and the command served for the logical volume is issued to the external storage device via the priority port corresponding to the command.

14. A control method of a storage device according to claim 9, wherein one issuing method out of the plurality of issuing methods is a method in which the command is transmitted to the external storage device via one port out of the plurality of ports, and changes over the port from which the command is transmitted to other port out of the plurality of ports when a total amount of data to be read or written based on the command transmitted via the port exceeds a preset first threshold value.

15. A control method of a storage device according to claim 9, wherein one issuing method out of the plurality of issuing methods is a method in which one priority port is preliminarily assigned for every logical volume that the external storage device offers out of the plurality of ports, and issues the command associated with the logical volume to the external storage device via the priority port corresponding to the command at a time after storing data to be read or written based on the command by an amount that a total amount of data to be read or written exceeds a preset second threshold value.

16. A control method of a storage device according to claim 9, wherein one issuing method out of the plurality of issuing methods is a method in which the command is transmitted to the external storage device via one ports out of the plurality of ports at a time after storing data to be read or written based on the command by an amount that a total amount of data to be read or written exceeds the first threshold value.

* * * * *